(12) United States Patent
Belliveau

(10) Patent No.: US 6,561,653 B2
(45) Date of Patent: May 13, 2003

(54) MULTIPLE LIGHT VALVE LIGHTING DEVICE OR APPARATUS WITH WIDE COLOR PALETTE AND IMPROVED CONTRAST RATIO

(76) Inventor: Richard S. Belliveau, 10643 Floral Park, Austin, TX (US) 78759

( * ) Notice: Subject to any disclaimer, the term of this patent is extended or adjusted under 35 U.S.C. 154(b) by 0 days.

(21) Appl. No.: 10/046,440

(22) Filed: Jan. 16, 2002

(65) Prior Publication Data

US 2003/0067588 A1 Apr. 10, 2003

Related U.S. Application Data

(63) Continuation-in-part of application No. 09/970,845, filed on Oct. 5, 2001.

(51) Int. Cl.[7] .................. G03B 21/00; G03B 21/26; G03B 21/14; H04N 3/12; G02F 1/1335
(52) U.S. Cl. .................. 353/31; 353/34; 353/37; 353/84; 353/88; 353/89; 353/97; 353/121; 348/740; 348/742; 348/743; 348/744; 349/5; 349/7; 349/8; 362/284; 362/257
(58) Field of Search .................. 353/30, 31, 81, 353/84, 88, 89, 97, 121; 348/740, 742, 743, 744; 349/5, 6, 7, 8; 362/257, 269, 238, 239, 251, 284, 295

(56) References Cited

U.S. PATENT DOCUMENTS

| | | | |
|---|---|---|---|
| 4,779,176 A | 10/1988 | Bornhorst | 362/223 |
| 5,113,332 A | 5/1992 | Richardson | 362/282 |
| 5,758,956 A | 6/1998 | Hutton | 362/294 |
| 5,828,485 A | 10/1998 | Hewlett | 359/291 |
| 5,967,636 A * | 10/1999 | Stark et al. | 353/84 |
| 6,220,730 B1 * | 4/2001 | Hewlett et al. | 362/297 |
| 6,309,070 B1 * | 10/2001 | Svetliza et al. | 351/221 |
| 6,359,662 B1 * | 3/2002 | Walker | 348/743 |
| 6,406,148 B1 * | 6/2002 | Marshall et al. | 353/31 |
| 2002/0080333 A1 * | 6/2002 | Lee | 353/31 |
| 2002/0176055 A1 * | 11/2002 | De Vaan et al. | 353/31 |

FOREIGN PATENT DOCUMENTS

WO 9818040 4/1998 .......... G02B/27/28

OTHER PUBLICATIONS

Http://www.video-direct.com/canon/mmprojectors/lv7325.html.

* cited by examiner

Primary Examiner—Russell Adams
Assistant Examiner—Melissa J Koval
(74) Attorney, Agent, or Firm—Walter J. Tencza, Jr.

(57) ABSTRACT

An apparatus is disclosed comprising a lamp which produces a first light which may be a white light; a first light valve, a second light valve, and a first aperture device, which may be a first electronically switchable filter. The first aperture device or the first electronically switchable filter function as selectively variable color separators. The first aperture device or the first electronically switchable filter each can be placed in a first state where the first light is separated into a first color light and a first residual light, and a second state where the first light is separated into a second color light and a second residual light. The first light valve receives the first light in the first state and the second light in the second state. The second light valve receives at least a portion of the first residual light in the first state or at least a portion of the second residual light in the second state.

18 Claims, 15 Drawing Sheets

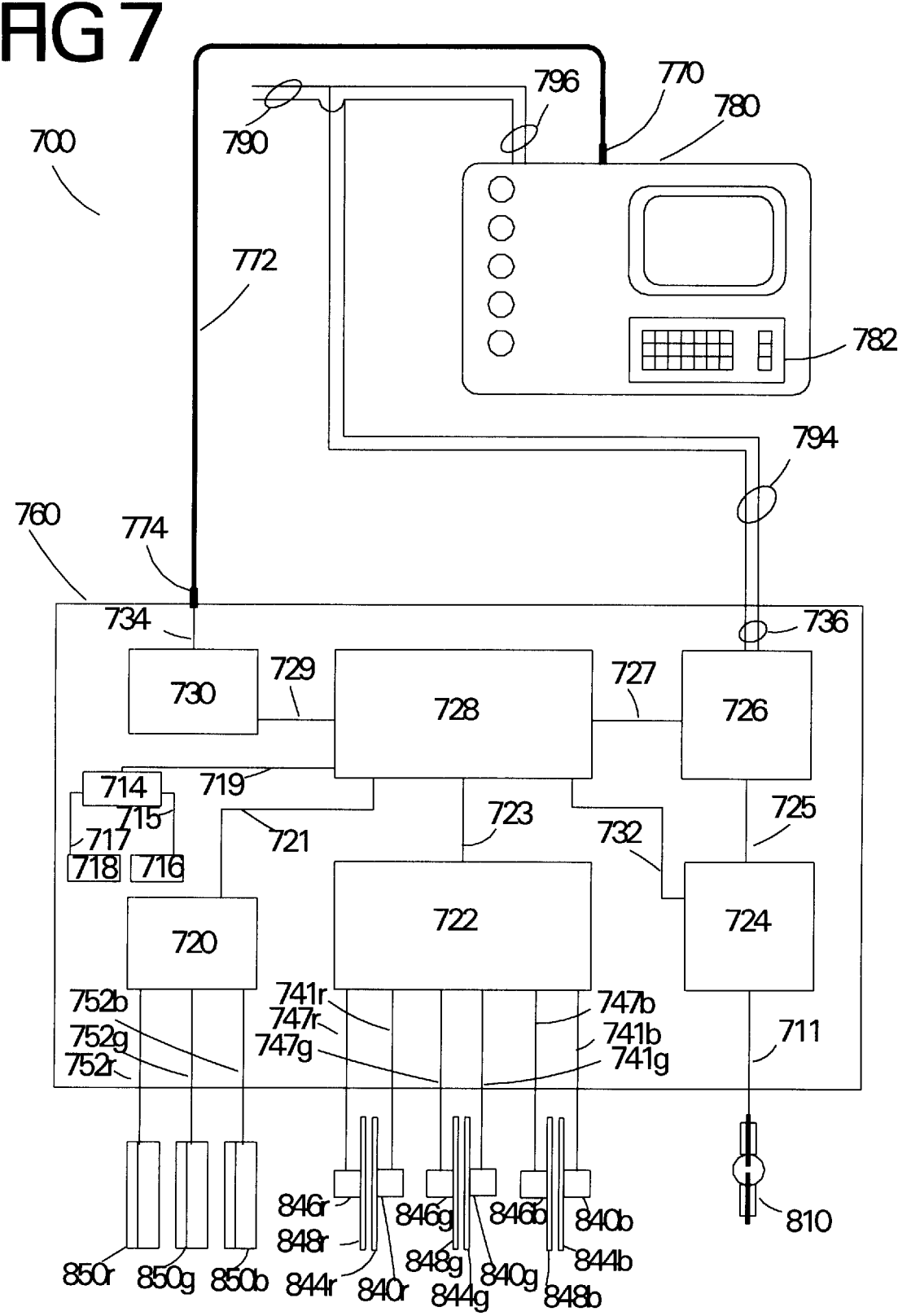

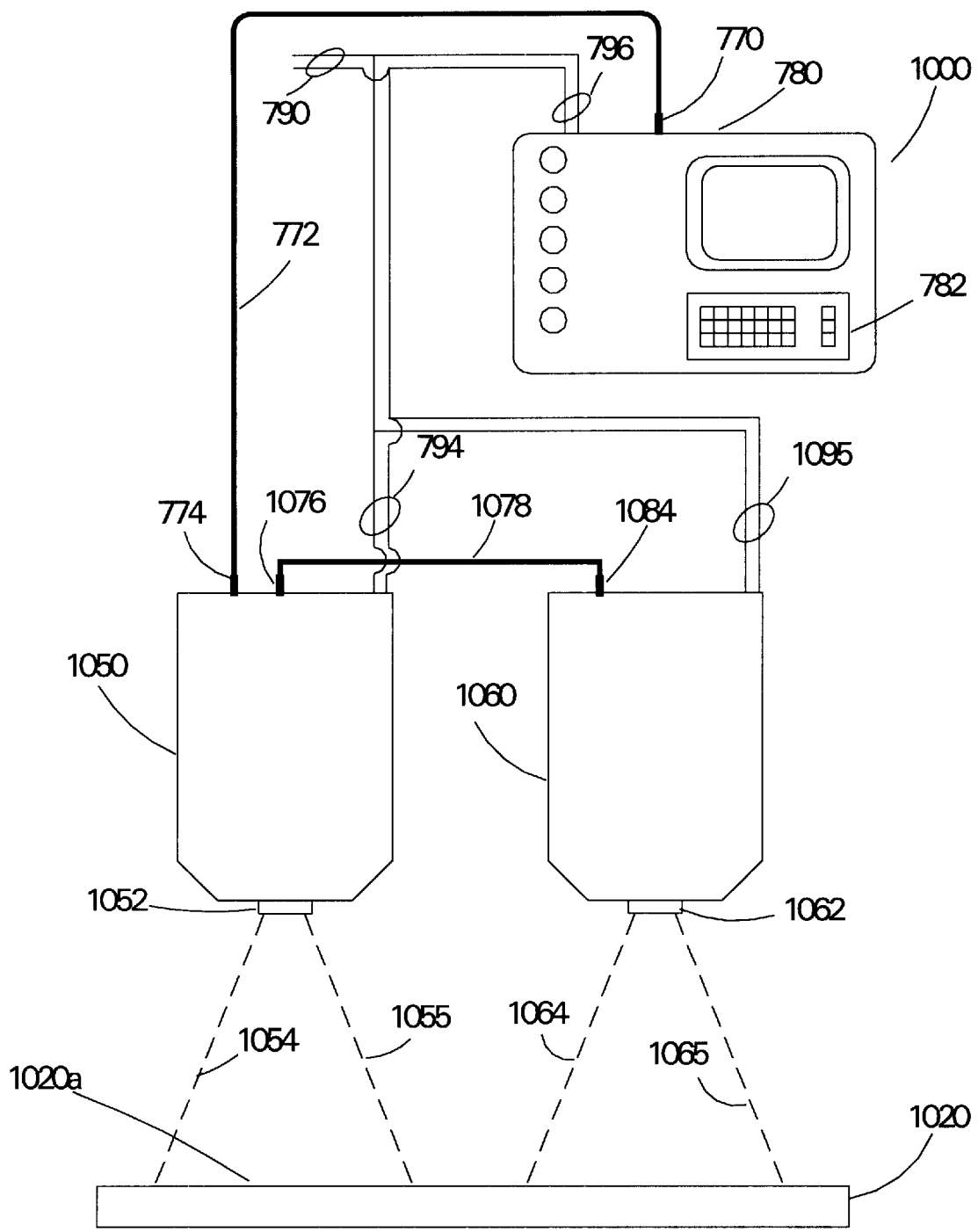

MULTIPLE LIGHT VALVE LIGHTING DEVICE OR APPARATUS WITH WIDE COLOR PALETTE AND IMPROVED CONTRAST RATIO

CLAIM FOR PRIORITY

This application claims the priority of, and is a continuation in part of, parent application Ser. No. 09/970,845, titled "MULTIPLE LIGHT VALVE LIGHTING DEVICE OR APPARATUS WITH WIDE COLOR PALETTE AND IMPROVED CONTRAST RATIO", which was filed on Oct. 5, 2001.

FIELD OF THE INVENTION

The present invention relates to stage lighting devices incorporating light valves for projecting images on a stage.

BACKGROUND OF THE INVENTION

Stage lighting devices incorporating light valves for the projection of images are known in the art. Stage lighting devices incorporating light valves are used to project patterns on a stage. Before electronic light valves, stage lighting devices used metal stencil patterns that were indexed on a wheel to produce the projected patterns upon the stage.

U.S. patent to U.S. Pat. No. 4,779,176 to Bornhorst titled "Light pattern generator" describes glass substrates with aluminum coatings that are used as projection patterns in a lighting device. U.S. Pat. No. 5,113,332 titled "Selectable mechanical and electronic pattern generating aperture module" to Richardson describes an electronic aperture or light valve used to generate the patterns projected from a lighting device. U.S. Pat. No. 5,758,956 titled "High intensity lighting projectors" to Hutton describes a controllable image quality projection gate providing advanced visual effects. Other types of electronic light valves have also been used with lighting devices. U.S. Pat. No. 5,828,485 titled "Programmable light beam shape altering device using programmable micromirrors" to Hewlett describes a digital micromirror device ("DMD") that is used to alter the shape of light that is projected onto a stage.

The prior art stage lighting devices are designed around a single light valve as the projection gate. The inventors have optimized their inventions to work best as a lighting device. Many inventors prefer the single light valve system as it may have a reduced cost over multiple light valve systems. High End Systems (Trademarked) of Austin, Tex. has found success with a multiple light valve projector in combination with a positioning mirror. The device called a Catalyst (Trademarked) is used like a periscope that mounts to the front of a video projector. It allows static images or moving video to be projected anywhere within a 360° by 180° hemisphere of movement. Images can be manipulated limitlessly in real-time from a dedicated control console. The preferred projector type of the prior art is a three light valve system. More information can be found at: Http://www.highend.com/pdfbin/NewCatalyst.pdf. The device is limited however as it uses a conventional multiple light valve projection system and can only produce a limited color palette.

In the prior art a single light valve is used. An aperture device containing filters or multiple aperture devices containing filters are located between a lamp producing white light and a single light valve to change the color of the light from the lamp sent to the single light valve. The single light valve systems can not do full color images unless they spin an aperture device containing color filters of red, blue and green in front of the single light valve. The aperture device containing the colors of red, blue and green is rotated, in the prior art, at a certain frequency in sync with the single light valve to produce a full color image. Because each color is only on for a third of the time, much of the energy from the lamp is lost. An example of this technique is shown at http://howstuffworks.lycos.com/projection-tv5.htm With existing regular video projection, three light valves are used with the white light produced from a lamp separated into red, green and blue as more of the light from the lamp is used to produce a full color image.

The problem is that for a video projection device built for video the red, green and blue colors are specially specified.

SUMMARY OF THE INVENTION

The present invention discloses a lighting device using multiple light valves which provide an improved contrast ratio from devices of the prior art. The lighting devices of embodiments of the present invention are capable of projecting a wide range of available colors.

The present invention allows a greater array of colors both saturated and less saturated to be used by first allowing the widest production of red, green and blue by a color separation system or device and then modifying the colors from the color separation system with aperture devices that contain color filters. Aperture devices modify the separated colors.

It is one object of the present invention to construct a multiple light valve lighting device with an improved lighting color palette.

It is yet another object of the present invention to construct a multiple light valve lighting device with an improved contrast ratio.

It is yet another object of the present invention to transmit commands over a communication system to the multiple light valve lighting devices where custom color palettes may be selected remotely.

It is yet another object of the present invention for the multiple light valve device to automatically improve the contrast ratio based upon the program material.

It is yet another object of the present invention for the multiple light valve lighting device to shutter the outputs of the individual light valves upon a command over the communication system.

It is yet another object of the present invention for the multiple light valve lighting device to shutter all of the individual light valves to produce a black out.

It is an object of the present invention to provide an apparatus comprising a lamp which produces a first light which may be a white light, a first light valve, a second light valve, and a first aperture device or a first electronically switchable filter. The first electronically switchable filter and electronically switchable filters generally may be considered to be aperture devices. The first aperture device or the first electronically switchable filter function as selectively variable color separators. The first aperture device or the first electronically switchable filter each can be placed in a first state where the first light is separated into a first color light and a first residual light and a second state where the first light is separated into a second color light and a second residual light. The first color light has a corresponding first frequency and the second color light has a corresponding second frequency. Varying the state of the first aperture device from the first state to the second state, varies a first output of the first aperture device from the first frequency of the first color light to the second frequency of the second color light. Varying the frequency of light produces different color lights. In this application a frequency of light is also referred to as a color light. The color light may have a frequency range or bandwidth as known in the art.

This means that light going to the red light valve may generally be close to the color red but may be selected to be orange, medium red, or dark red for example. Such different shades of red may be considered a first color and a second color. I.e. orange and medium red may be considered different colors or a first color and a second color, respectively. The first light valve receives the first color light in the first state and the second color light in the second state. The second light valve receives at least a portion of the first residual light when the first aperture device is in the first state or the second residual light when the first aperture device is in the second state.

The present invention in one embodiment discloses a lighting device comprised of a first device, a first light valve, a second light valve, a combining device, and a projection lens device. The first device may be comprised of a color separator device and an aperture device. The first device may separate a first light from a light source into a first frequency light and a second frequency light, wherein the first and second frequencies are different. The first and second frequency lights may be applied to first and second light valves, which produce first and second light valve output lights, respectively. Each of the first and second light valve output lights have a frequency. The combining device may combine the first light valve output light and the second light valve output light to produce a combined light at an output of the combining device. The projection lens device may receive the combined light and project light from the projection lens. The frequency of the first light valve output light or the frequency of the second light valve output light can be selectively varied, by, for example, varying the state of the first aperture device from the first state to the second state, which may vary a first output of the first aperture device from a first frequency light to a second frequency light; by an aperture device located in the first device; or by the combining device.

BRIEF DESCRIPTION OF THE DRAWINGS

FIG. 7 shows a remote console and a control system for a multiple light valve lighting device in accordance with an embodiment of the present invention;

FIG. 10 shows two multiple light valve lighting devices connected over a communication system to a remote console.

DETAILED DESCRIPTION OF THE DRAWINGS

Figure 1:
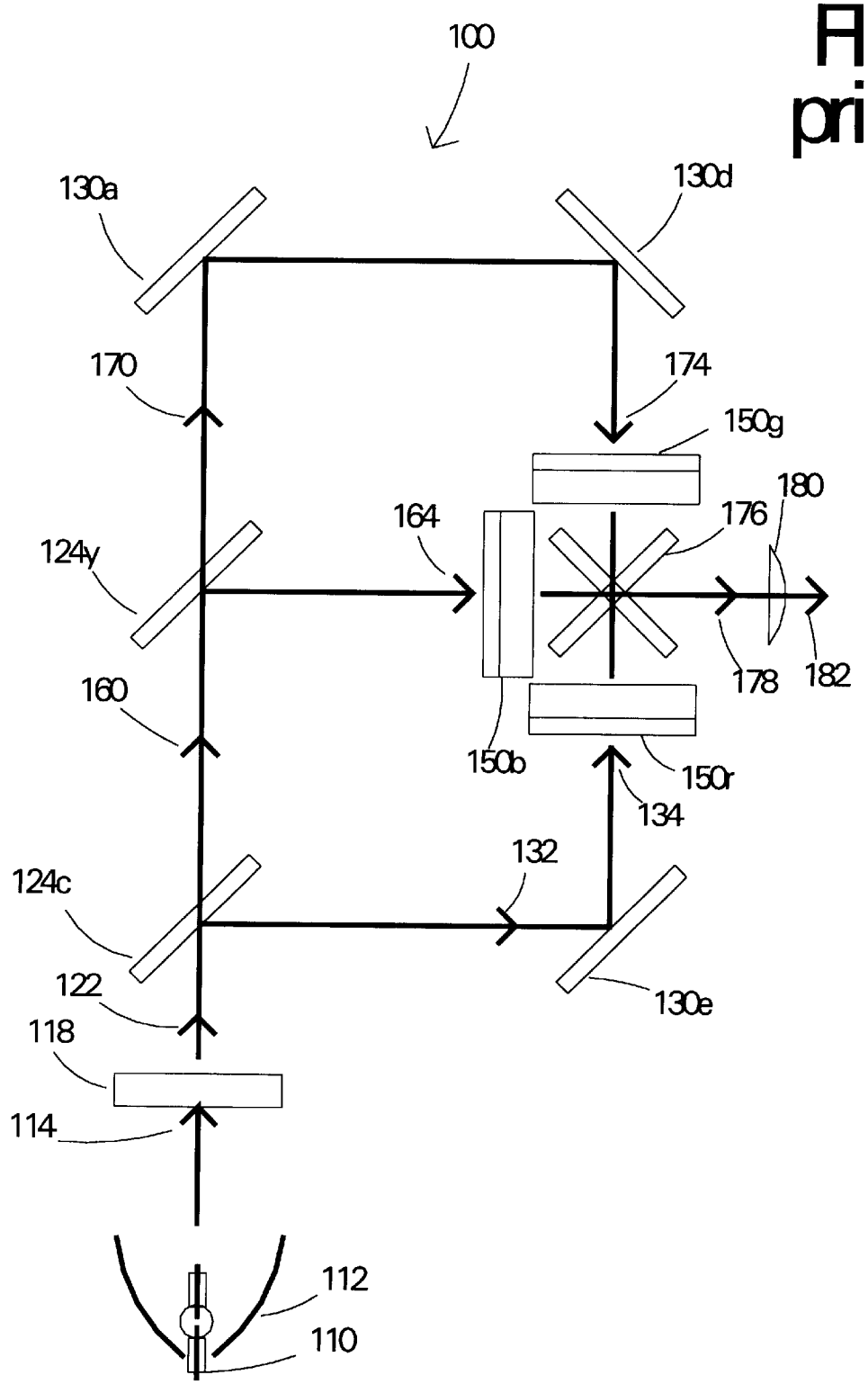
FIG. 1 shows a prior art multiple light valve projector optical system comprised of three light valves.

FIG. 1 shows a prior art multiple light valve projector optical system 100 comprised of light valves 150g, 150r and 150b. The multiple light valve projector optical system 100 is further comprised of a lamp 110, a reflector 112, a polarization converter 118, a color separator 124c, a color separator 124y, reflector 130a, a reflector 130d, a reflector 130e, a color combining system 176, and a focusing lens, which can also be referred to as a projection lens 180.

The lamp or light source 110 produces a white light whose path is illustrated by arrow 114. The white light or any light of a plurality of frequencies may be considered a first light of a plurality of frequencies within the meaning of various claims of the application. The lamp 110 has its energy focused by the reflector 112. Only a single lamp is shown as the light source or lamp 110 but it is known in the art that multiple lamps may be coupled together to act as the light source. The lamp 110 produces visible white light with the components of red, blue and green wavelengths. The light focused by the reflector 112 as shown by the arrow 114 is directed to the polarization converter 118. The light exits the polarization converter 118 and is directed towards color separator 124c as shown by an arrow 122. Color separator 124c can be a dichroic color separation filter that reflects red light in the direction of an arrow 132 while transmitting blue and green light in the direction of an arrow 160. The action by the color separator 124c can be described as separating the white light into a first color light and a first residual light. The first residual light may be comprised of one or more frequencies and a "portion" of the first residual light may be defined as including one or more frequencies of the one or more frequencies of the first residual light. Similarly a "portion" of any other particular light as referred to in this application, may be comprised of one or more frequencies of the one or more frequencies of that particular light.

The red light as shown by arrow 132 is directed towards the reflector 130e. The reflector 130e reflects the red light in the direction of an arrow 134 towards the light valve 150r. The blue and green light, or first residual light, transmitted by the color separator 124c is directed towards the color separator 124y as shown by an arrow 160. Color separator 124y reflects blue light, which is directed towards the light valve 150b as shown by an arrow 164. Color separator 124y transmits green light towards reflector 130a as shown by an arrow 170. The action by the color separator 124y can be described as separating the first residual light into a second color light and a second residual light. Reflector 130a reflects the green light towards the reflector 130d and the green light is reflected towards the light valve 150g as shown by an arrow 174.

The red, green and blue lights that are received by the light valves 150r, 150g, and 150b, respectively are next directed through their corresponding light valve towards the color combining system or device 176. The red, green and blue lights are recombined to a common path and are directed towards the focusing lens 180 as shown by an arrow 178. The lens 180 forms an image from the lights which passes through the valves 150r, 150b and 150g and which are combined by combining system 176 and directs the combined light in the direction of an arrow 182 to a projection surface (not shown) where the image from the light valves 150r, 150b, and 150g is projected.

Figure 2:
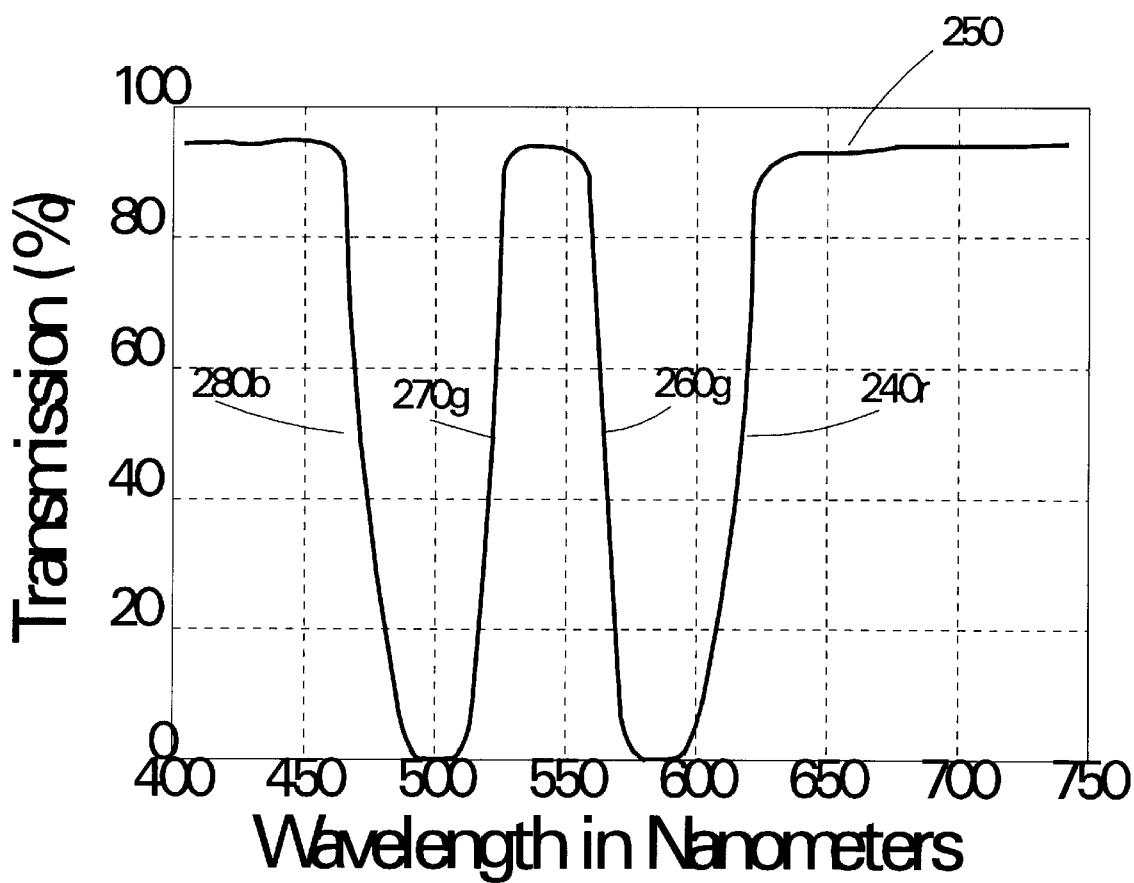
FIG. 2 is a graph showing the light transmission versus wavelength of the prior art system of FIG. 1.

FIG. 2 is a graph showing slopes 250 of light transmission versus wavelength of the prior art system of FIG. 1. The slopes 250 show the transmitted frequencies of light to be combined as the overall available light output at arrow 182. The lamp 110 provides white light, which includes light of a variety of wavelengths. As an example, about ninety percent of a light component in the white light at arrow 114 having a wavelength of 450 nanometers is transmitted through the lens 180 to arrow 182 (minus the normal losses associated with the various optical components), as shown by FIGS. 1 and 2. As another example, about zero percent of a light component in the white light at arrow 114 having a wavelength of 500 nanometers is transmitted through the lens 180 to arrow 182.

The prior art slopes 250 in FIG. 2 shows cutoff points 280b, 270g, 260g, and 240r. FIG. 2 represents the transmission, and cutoff of the red, blue and green wavelengths created by the color separation filters 124c and 124y of the prior art system 100 of FIG. 1. The blue light created by the color separation filters 124c and 124y has a cutoff point 280b. A blue light cutoff 280b in FIG. 2 is approximately 472 nanometers (or abbreviated as nm).

Green light cutoffs are determined at two locations on the graph, 270g and 260g. Green light cutoff 270g is located at approximately 518 nm and the green light cutoff 260g is located at approximately 560 nm. The red light cutoff 240r is located on the graph at approximately 615 nm.

Figure 3:
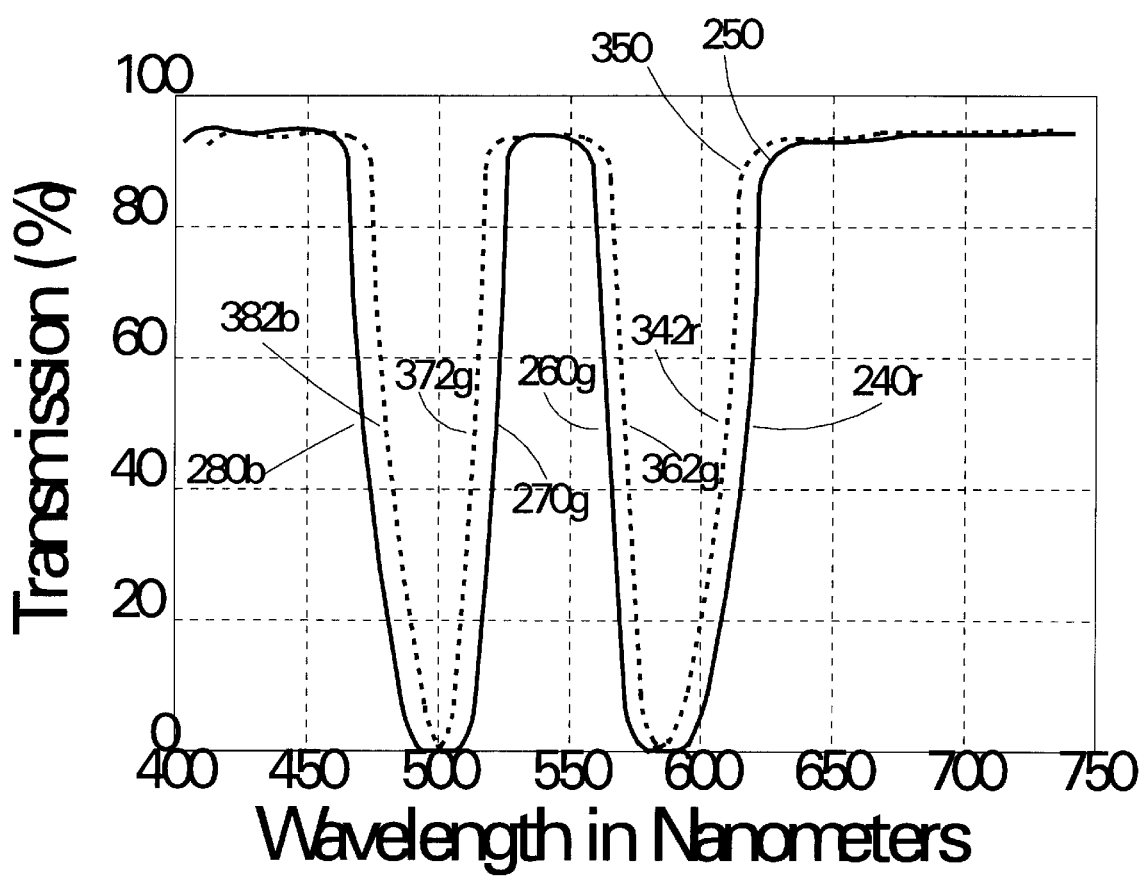
FIG. 3 is a graph which compares the prior art FIG. 2 light transmission versus wavelength with the light transmission versus wavelength produced by the embodiment of FIG. 8 in accordance with the present invention.
Figure 8:
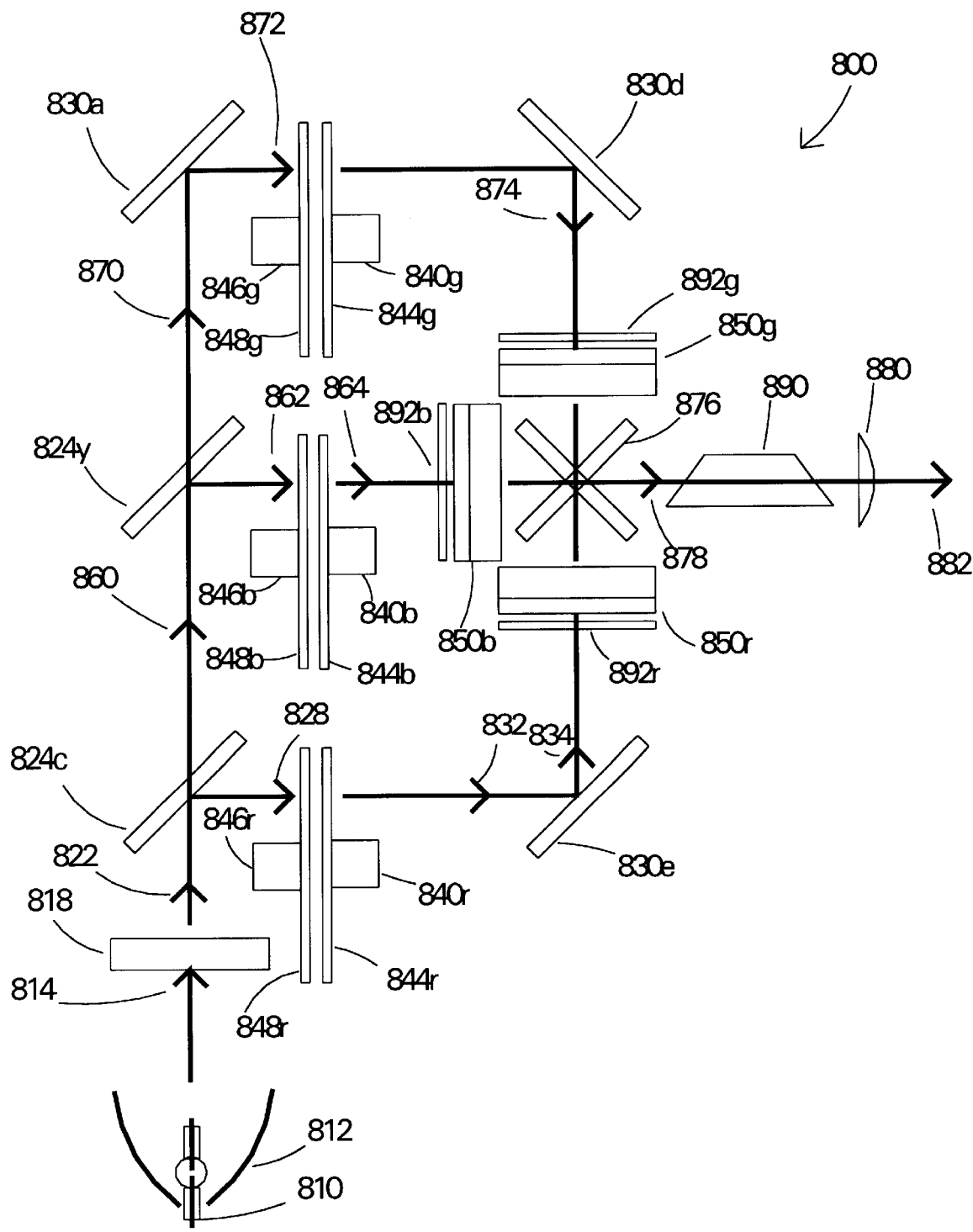
FIG. 8 shows an optical apparatus of an embodiment of the present invention using three light valves.

FIG. 3 is a graph which compares the prior art FIG. 2 slopes 250 of light transmission versus wavelength with the slopes 350 of light transmission versus wavelength produced by the embodiment of FIG. 8 in accordance with the present invention. The slopes 350 show the available frequencies of light that can be transmitted from the lamp 810 to be combined and projected from the lens 880 in the direction of 882.

The present invention in the embodiment of FIG. 8 increases the bandwidth of the colors red, green and blue (shown by the dashed slopes 350 of FIG. 3) versus the FIG. 2 prior art bandwidth of the colors red, green and blue (shown on the FIG. 3 graph by the solid slopes 250). The prior art blue cutoff (approximately 472 nm) is shown at point 280b on solid line slope 250. The new blue cutoff is shown at a location on the dashed slope 350 identified by 382b (approximately 478 nm).

The prior art green light cutoffs are shown at a location 270g (approximately 518 nm) and a location 260g (approximately 560 nm) on the solid sloped line 250 in FIG. 3. The wider bandwidth of the embodiment of FIG. 8 is shown by locations 372g (approximately 512 nm) and 362g (approximately 566 nm) on the dashed sloped line 350 in FIG. 3.

The prior art red light cutoffs are shown at a location 240r (approximately 615 nm) on the solid sloped line 250 in FIG. 3. The wider bandwidth of the present invention is shown by a location 342r (approximately 609 nm) on the dashed sloped line 350 in FIG. 3.

Generally speaking the greater bandwidth of the FIG. 8 embodiment versus the FIG. 1 prior art embodiment means that if the same amount of light is supplied by lamp 110 and lamp 810, the system 800 of FIG. 8 will produce more light at its output than the prior art system of FIG. 1.

Figure 4:
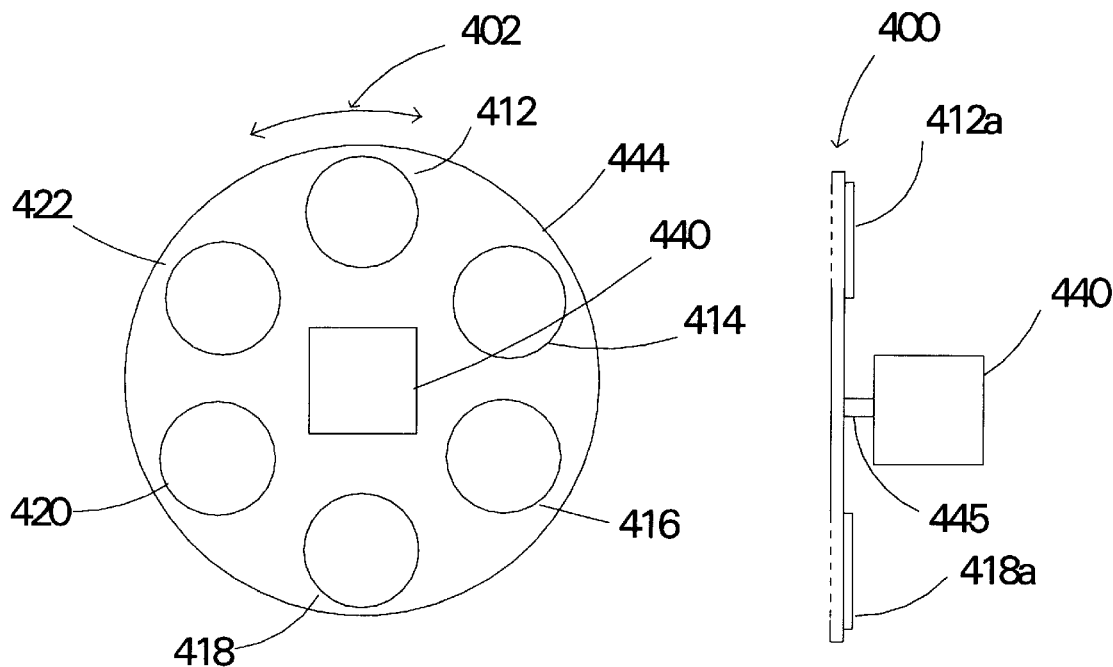
FIG. 4A shows an aperture wheel for use with an embodiment of the present invention, such as FIG. 8, for modifying the bandwidths of red, blue or green light.
FIG. 4B shows a side view of the aperture wheel of FIG. 4A.

FIG. 4A shows an aperture wheel 400 for use with the embodiment of FIG. 8 of the present invention for modifying the bandwidths of the red, blue or green light. The aperture wheel 400 is comprised of apertures 410, 412, 414, 416, 418, 420, and 422, and motor 440.

The arrows 402 show that the wheel 400 can be rotated to bring the apertures 412, 414, 416, 418, 420, and 422 in a desired position. The apertures 412, 414, 416, 418, 420, and 422 may be comprised of bandwidth modifying filters and if desired at least one of the apertures 412–422 may be left without a filter to pass light unobstructed. Any of the apertures 410–422 may also be aluminum or a suitable light blocking material to act as a shutter. The motor 440 is used to rotate the aperture wheel 400. The aperture wheel 400 can be called an aperture device and can be used in the embodiment of FIG. 8 for any of the aperture devices in FIG. 8, such as aperture device 848r.

FIG. 4B shows a side view of the aperture wheel 400 of FIG. 4A. Filters 412a and 418a are shown fixed over apertures 412 and 418, respectively, in any suitable way. The motor 440 is shown connected to a motor shaft 445. The motor shaft 445 is fixed to the aperture wheel 400 in any suitable way.

Figure 5:
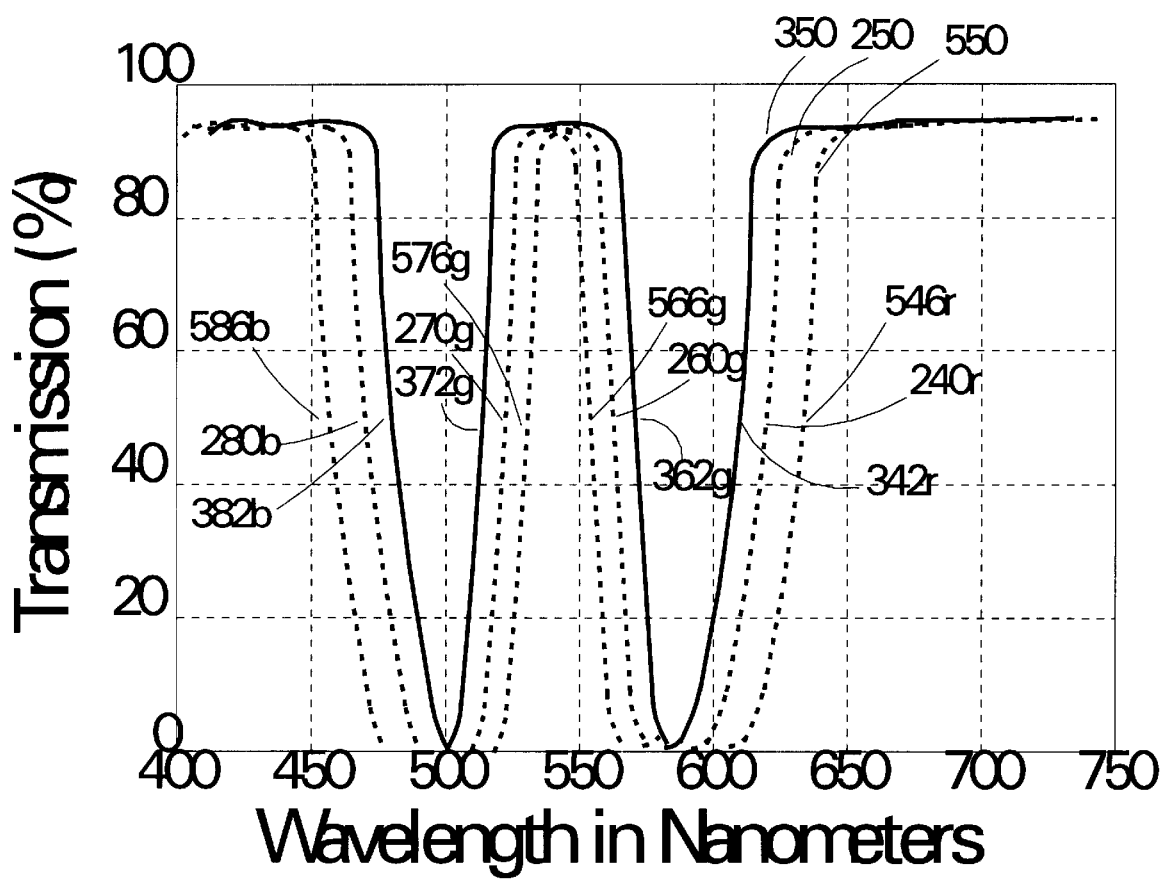
FIG. 5 is a graph representing three different slope conditions of light transmission versus wavelength. The first set of slopes corresponds to the FIG. 8 embodiment and is also shown in FIG. 3. The other two sets of slopes can also be obtained by the FIG. 8 embodiment by adjusting the aperture devices.

FIG. 5 is a graph which includes three different available slopes of light transmission versus wavelength for the colors of red, green and blue light frequencies. Referring to FIG. 5, the three different cutoffs of 280b, 382b and 586b are all blue cutoffs. The point 382b is obtained by using color separators 824c and 824y specially selected to combine to produce that slope cutoff point. In this case if we refer to FIG. 8, aperture devices 848r and 844r are most likely in a through hole position so that no additional modification of the blue light from the color separators 824c and 824y takes place. If next we energize a motor to move a color modifying filter into place we can alter the color of the blue light so that the frequency changes as shown by the slope 280b of FIG. 5. In this example, we are just altering the blue light color and not the red or green. If we energize the motor on aperture device 848r or 844r to bring yet another different modifying filter into place, we further alter the frequency of light being sent to the blue light valve 850b of FIG. 8 so that the slope on the graph changes to 50% point 586b of FIG. 5. At no time did the rest of the slopes for Green and Red change as we were only changing the Blue aperture devices.

The 50% cutoff points for the blue, green, green, and red light on the solid slopes 350 of FIG. 3 are at points 382b, 372g, 362g, and 342r, respectively. The blue cutoff 382b (approximately 478 nm) can be modified by an aperture wheel like aperture wheel 400 of FIG. 4A or aperture wheel 600 of FIG. 6A in order to provide for selectable cutoffs. I.e. the aperture wheel 400 may be the aperture device 848b and/or the aperture device 844b in the FIG. 8 embodiment. The motor of the aperture device 440 of FIG. 4a may rotate the apertures on the aperture device to place a color modifying filter in the light path of the blue light reflected by the color separator 824y of FIG. 8.

Figure 6A:
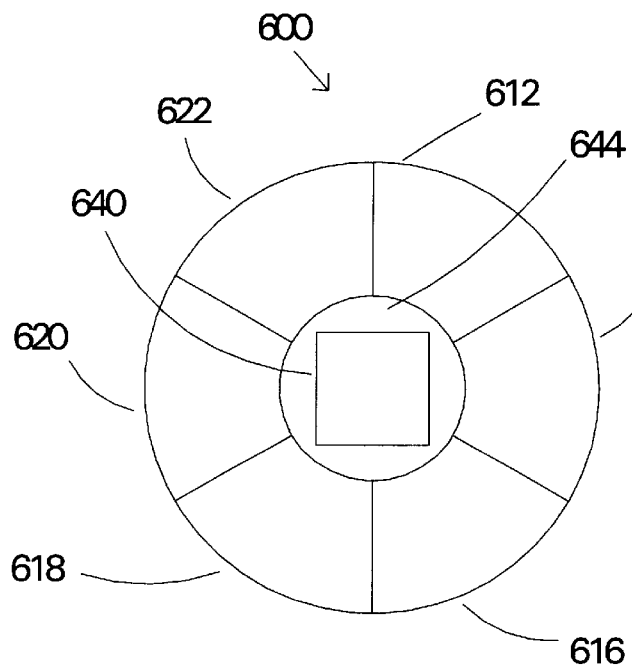
FIG. 6A shows an aperture wheel for use in the embodiment of FIG. 8, with wedge shaped apertures.

The green light cutoffs 372g and 362g can be modified by an aperture wheel like aperture wheel 400 of FIG. 4A or aperture wheel 600 of FIG. 6A. The aperture wheel 400 or 600 may be the aperture device 848g or 844g. The aperture wheel 848g or 844g may be controlled to modify the cutoff of 372g and 362g to new selectable cutoffs of 270g (approximately 512 nm) and 260g (approximately 560 nm) on the slopes shown as dashed lines 250 or cutoffs of 576g (approximately 525 nm) and 566g (approximately 552 nm) on the dashed slopes 550.

The red cutoff 342r can be modified by an aperture wheel like aperture wheel 400 of FIG. 4A or aperture wheel 600 of FIG. 6A as to now provide for selectable cutoffs. The aperture wheel 400 or 600 may be the aperture device 848r or 844r in FIG. 8. The aperture wheel 848r or 844r may be controlled to modify the red light cutoff of 342r (approximately 609 nm) to 240r (approximately 615 nm) on the dashed slope 250 and 546r (approximately 628 nm) on the dashed slopes 550 in FIG. 5.

FIG. 6A shows another type of aperture wheel 600. The aperture wheel 600 has trapezoidal apertures 612, 614, 616, 618, 620, and 622. The apertures 612–622 may be color filter sections such as dichroic filters or other color filters known in the art. The apertures 612–622 may also be aluminum or a light blocking material to act as a shutter. The apertures 612–622 are fixed to the central section 644 of the aperture wheel 600 by any suitable means. A motor 640 rotates the apertures 612–622 to a position in the path of a light. Shutters and color filters may be positioned in any aperture location (of apertures 612–622) on the aperture wheel 600. The aperture wheel 600 may only use one or two apertures as desired and not all of the apertures 612–622 need to have filters or light blocking material and some can be left open if desired. Blocking in the present application may mean blocking by shutter a particular color light without changing the frequency.

Figure 6B:
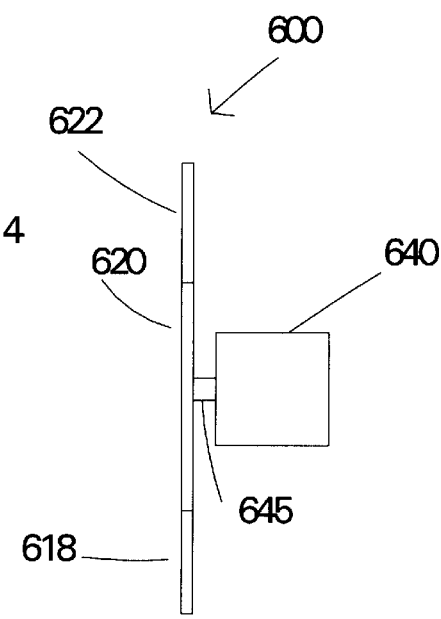
FIG. 6B shows a side view of the aperture wheel of FIG. 6A.

FIG. 6B shows a side view of the aperture wheel 600. A side view of the apertures 618, 620, and 622 are also shown. Each of the apertures 618, 620, and 622 may include a color filter or shutter. The motor 640 has a motor shaft 645 that is fixed in any suitable manner to the aperture wheel 600 to rotate the aperture wheel 600. The aperture wheel 600 can rotate with respect to the motor 640.

FIG. 7 shows a remote console 780, a power source 790, and a control system 760. The control system 760 would be part of and used in a lighting device such as lighting device 1050 of FIG. 10. The power source 790 provides power to the lighting device, such as 1050 and the remote console 780 can control the lighting device 1050.

The control system 760 in FIG. 7 includes thermal monitoring device 714, sensor 716, sensor 718, a light valve driving device 720, a motor drive device 722, a lamp power supply 724, a power supply 726, microprocessor 728, and communications node 730.

The remote console 780 for generation of command signals receives power from the power source 790 (which may be a power line) and the power source 790 is coupled to the remote console 780 through conductors 796 in a known manner. A communications cable 772 is connected between the remote console 780 at connection point 770 and the control system 760 at connection point 774. The communications used over the communication cable 772 may be serial data that contain unique addresses for discrete communication with potentially a plurality of multiple light valve lighting devices, such as for example, lighting device 1060 or 1050 shown in FIG. 10. The communications used over the communication cable 772 may be bidirectional or more than one communications system may be used for example that disclosed in my copending application titled "METHOD AND APPARATUS FOR DIGITAL COMMUNICATIONS WITH LIGHTING DEVICES" Ser. No. 09/394,300 filed Sep. 10, 1999, incorporated by reference herein.

Control system 760 of FIG. 7 may be enclosed within a housing of a lighting device like that shown as 1050 of FIG. 10. The communications node 730 of FIG. 7 receives command signals from the remote console 780 over the communications cable 772 through the connection point 774 and the conductors 734. The connection point 774 may be a suitable connector as known in the art and is connected by conductors 734 to the node 730. The communications node 730 transfers data and commands from the remote console 780 to microprocessor 728 through conductors 729.

The microprocessor 728 may also include the memory necessary for the operating system and the processing of commands. The microprocessor 728 may be comprised of several microprocessors or it may be constructed of several discrete logic circuits. Power supply 726 is connected through conductors 736 and power connection point 794 to the power source 790. The power source 790 provides the necessary power to the power supply 726 through connection point 794 and through internal conductors 736 and to the lamp power supply 724 through conductors 725. The power supply 726 is connected to the microprocessor 728 through conductors 727 and to the lamp power supply 724 through conductors 725. The lamp power supply 724 is connected to the lamp 710 through conductors 711. The lamp power supply 724 may also receive control signals through the conductor 732 from the microprocessor 728.

The microprocessor 728 receives thermal information from the thermal monitoring device 714 via conductors 719. The thermal monitoring device 714 may receive information from multiple thermal sensors such as the sensors 718 and 716 through conductors 717 and 715, respectively. The sensors 718 and 716 can be any thermal sensor as known in the art.

The microprocessor 728 connects to the motor drive device 722 through conductors 723 and may provide power and control signals to the motors 846r, 840r, 846g, 840g, 846b, and 840b. The motor drive device 722 connects to the motors 846r, 840r, 846g, 840g, 846b and 840b through conductors 747r, 741r, 747g, 741g, 747b and 741b, respectively. The motors 846r, 840r, 846g, 840g, 846b and 840b rotate aperture wheels 848r, 844r, 848g, 844g, 848b and 844b, respectively. The microprocessor 728 is connected to the light valve driving device 720 through conductors 721. The light valve driving device 720 controls the light valves 850r, 850g and 850b over conductors 752r, 752g, and 752b. The conductors 736, 734, 729, 727,723,725,711,721,752r, 752g, 752b, 747r, 741r, 747g, 741g, 747b, 741b, 732, 717, 715, and 719 are shown simplified. The conductors may be multiple conductors and may be wired or copper conductors such as for example a circuit board as known in the art.

FIG. 8 shows an optical apparatus 800 of an embodiment of the present invention using three light valves 850g, 850b, and 850r. The apparatus 800 also includes a lamp 810, polarization converter 818, reflectors 812, 830a, 830d, 830e, color separators 824c and 824y, motors 840r and 846r and aperture wheels 844r and 848r, motors 840b and 846b and aperture wheels 844b and 848b, motors 840g and 846g, and aperture wheels 844g and 848g, a color combining device 876, and a focusing lens 880.

The lamp 810 has its energy focused by the reflector 812. The lamp produces visible white light with light components having red, blue and green wavelengths. The white light focused by the reflector 812 as shown by an arrow 814 is directed to the polarization converter 818. The white light exits the polarization converter 818. The purpose of a polarization converter is known in the art. It converts the unpolarized white light from the lamp 810 and reflector 812 into polarized light. The light valves 850g, 850b, and 850r operate with polarized light. In one controlled condition the light valves 850g, 850b, and 850r let polarized light pass through and in the other controlled condition light is blocked from passing. Color separator 824c can be a dichroic color separation filter that reflects or separates out red light in the direction of an arrow 828 while transmitting or separating out a residual light comprised of blue and green light in the direction of an arrow 860. The color red light which is reflected at the first color separator 824c can be called the first color light in a process in accordance with an embodiment of the present invention.

The red light as shown by arrow 828 is directed towards the two aperture wheels 848r (driven by the motor 846r) and 844r (driven by the motor 840r). The aperture wheels 848r and 844r may be similar to aperture wheels shown in FIGS. 4A–B and 6A–B and may be considered aperture devices by themselves or in combination or in combination with the motors 840r and 848r. The red light may pass through to the selected filters or shutters positioned by the aperture wheels 848r and 844r in the path of the red light at the location shown by arrow 828 and may next travel in the direction of an arrow 832 to the reflector 830e. The red color light next travels in the direction of an arrow 834 towards a variable aperture 892r. The variable aperture 892r may be an iris. The term iris, generally speaking, is known in the art. The variable aperture 892r may be motorized. The variable aperture 892r may act as a mask to change a rectangular image created by a rectangular light valve, which is the type of light valve that light valve 850r may be, to a round image that is adjustable. The red light passes through the variable aperture 892r, then through the light valve 850r where the red light is controlled through the light valve 850b in a manner known in the art. The red light may pass though the light valve 850b to the color combining device 876.

The residual blue and green light transmitted or separated out by color separator 824c is directed towards the color separator 824y as shown by arrow 860. Color separator 824y reflects blue light, which is directed towards the two aperture wheels 848b (driven by the motor 846b) and the aperture wheel 844b (driven by the motor 840b). The aperture wheels 848b and 844b may be similar to those shown in FIGS. 4A–B or 6A–B and may be thought of separately or in combination or in combination with the motors 840b and 846b as aperture devices. The blue light may pass through a selected filter or shutters (similar to that shown in FIGS. 4A–B or 6A–B) positioned by the aperture wheels 848b and 844b in the path of the blue light at the location of arrow 862 and may next travel in the direction of arrow 864 towards a variable aperture 892b. The variable aperture 892b may be an iris. The variable aperture 892b may be motorized. The variable aperture 892b may act as a mask to change a rectangular image created by a rectangular light valve, which is the type of light valve that light valve 850b may be, to a round image that is adjustable. The blue light passes through the variable aperture 892b, then through the light valve 850b where the blue light is controlled through the light valve 850b in a manner known in the art. The blue light may pass though the light valve 850b to the color combining device 876.

Color separator 124y transmits or separates out green light towards reflector 830a as shown by an arrow 870. Reflector 830a reflects the green light towards the two aperture wheels 848g (driven by the motor 846g) and the aperture wheel 844g (driven by the motor 840g). Aperture wheels 848g and 844g may be similar to those shown in FIGS. 4A–B or FIGS. 6A–B and may be considered to be separately or in combination, or in combination with motors 846g and 840g to be aperture devices. The blue light may pass through a selected filter or shutter positioned by the aperture wheels 848g or 844g in the light path and may next travel in the direction towards the reflector 830d.

The green light is reflected off of reflector 830d in the direction of the arrow 874 towards a variable aperture 892g. The variable aperture 892g may each be an iris. The variable aperture 892g may be motorized. The variable aperture 892g may act as a mask to change a rectangular image created by a rectangular light valve, which is the type of light valve that light valve 850g may be, to a round image that is adjustable. The green light passes through the variable aperture 892g, then through the light valve 850g where the green light is controlled through the light valve 850g in a manner known in the art. The green light may pass though the light valve 850g to the color combining device 876.

The color combining device 876 combines the red, green and blue light controlled by the light valves 850g, 850b, and 850r and the combined light is sent in the direction of the arrow 878 towards a prism 890 which may be a Dove prism as known in the art for rotation of images created by the light valves 850g, 850b, and 850r. The prism 890 may be rotated with a motor as known in the art. The green light may pass through the prism 890 and then to the focusing lens 880. The lens 880 may be considered to be a projection lens. An image is focused in the direction of arrow 882 onto a projection surface not shown.

Figure 9A:
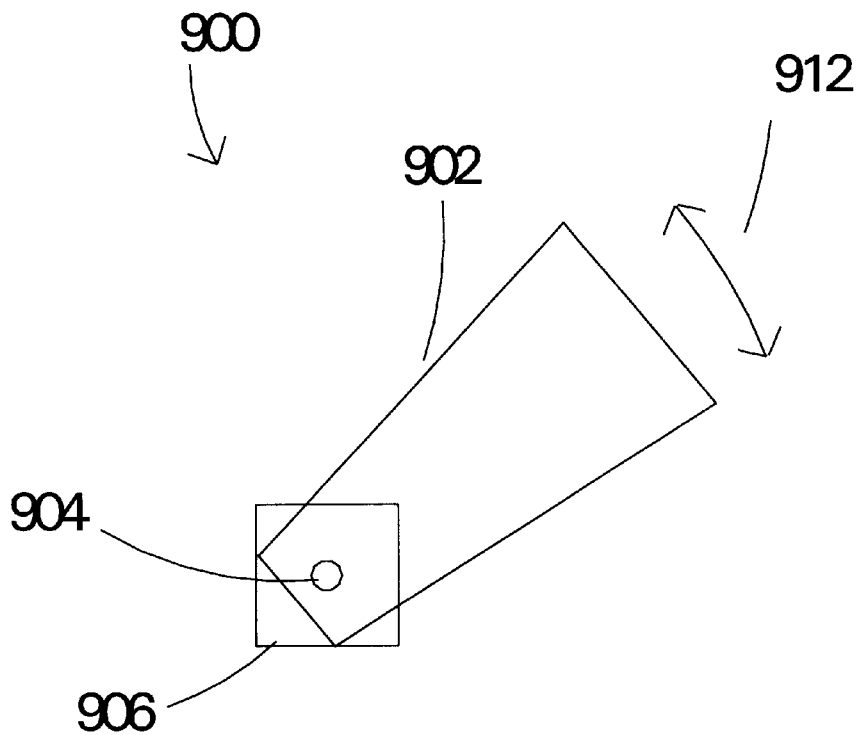
FIG. 9A shows an apparatus comprised of a shutter device or a single color filter, a light blocking material, a motor shaft, and a motor which can be used in the embodiment of FIG. 8.

FIG. 9A shows an apparatus 900 comprised of a shutter device, single color filter, or light blocking material 902, a motor shaft 904, and a motor 906. The single color filter 902 can be rotated into a light path by the motor 906. The filter 902 rotates with respect to the motor 906 on the shaft 904. The shaft 904 is rotatably connected to the motor 906, and the shaft 904 is fixed to the filter or light blocking material (shutter) 902 in any suitable way. Arrows 912 show the direction of the filter or light blocking material 902 when the motor 906 is energized and the shaft 904 is rotated. Apparatus 900 can be considered an aperture device in accordance with the present invention and can be placed in the FIG. 8 embodiment in the same locations as any of the aperture devices for example 844r or 846r of FIG. 8. Or 846r could be an aperture device that is an aperture wheel while 844r could be apparatus 900 of FIG. 9 and might act as a shutter only as 902 is fitted with light blocking material.

Figure 9B:
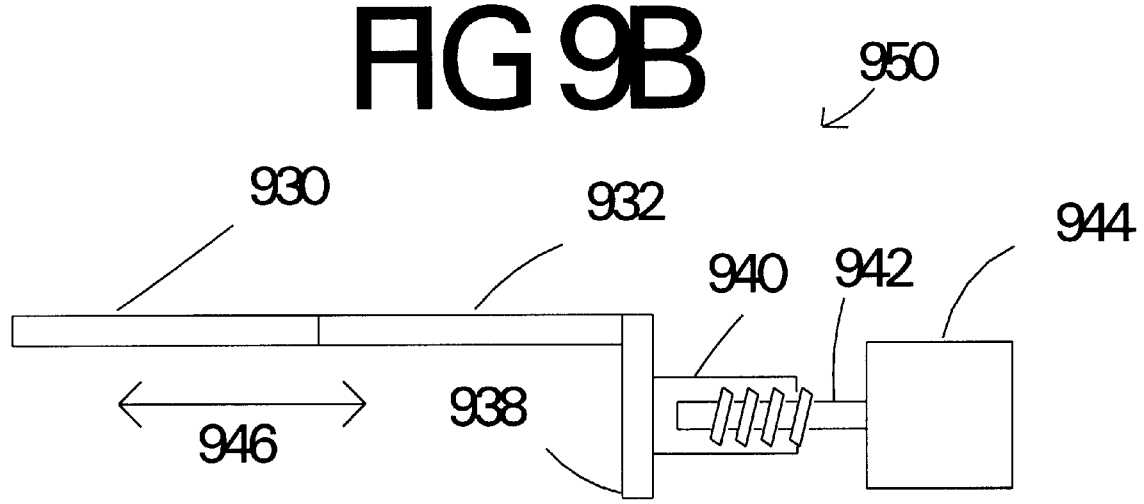
FIG. 9B shows a linear aperture device that can insert apertures into a light path which can be used in the embodiment of FIG. 8.

FIG. 9B shows a linear aperture device 950 that can insert apertures into a light path. The linear aperture device 950 is comprised of apertures 930 and 932, a mounting plate 938, a power nut 940, a worm gear shaft 942, and a motor 944. The apertures 930 and 932 may contain color filters or light blocking materials. The apertures 930 and 932 are fixed to the mounting plate 938 that is in turn fixed to the power nut 940. The power nut 940 is driven by a worm gear shaft 942 by the motor 944. The worm gear shaft 942 is rotatably connected to the motor 944. Arrows 946 show the direction of movement of the apertures 930 and 932 when the motor worm gear shaft 942 is rotated. The device 950 of FIG. 9B can be used in any location where an aperture device is used. For example it could be place in the location of 844r of FIG. 8. It could place a color filter or a light blocking material into the path of the red light before the light passes through to the reflector 830e.

Video projection systems used for projecting conventional video in the prior art have a preferred color range for video. For example in the prior art devices, such as FIG. 1, the color separators 124c and 124y work together as known in the art to separate white light emitted from a lamp into separate red, green and blue components. Specifications of the color separators 124c and 124y are designed so that the bandwidths of red, green and blue light are controlled to produce the best video image. This is important to video because if the colors of red, blue and green light have too wide a bandwidth, the video images can appear washed out and unnatural looking to the viewer. If the bandwidths of red, green, and blue light are too narrow the color will look very saturated but the projector can suffer from poor overall output. An example of the prior art bandwidths and cutoff frequencies for video is shown in FIG. 2.

The present invention in various embodiments specifies a color separation system with wide bandwidths and a selectable bandwidth system for modifying the color palette of a multiple light valve lighting device for lighting applications. FIG. 3 shows the prior art cutoffs for red, green and blue light on the solid slope line 250 on the transmission graph. The dashed line 350 shows an increased bandwidth of the present invention over the prior art for red, green and blue light. It is preferred to have the greatest bandwidth possible for each of the red, green and blue colored lights. Once the wide bandwidth color separation system of the present invention is used, selectable aperture wheels or aperture devices with variable cutoff frequencies can be placed in the locations of for example aperture wheels 848g, 844g, 848b, 844b, 848r and 844r of FIG. 8 to provide adjustable bandwidths for the red, green and blue wavelengths.

FIG. 5 illustrates a wide bandwidth color separation system of the present invention of red, green and blue light as shown by the solid slopes 350. Selectable aperture wheels, such as apertures wheels 400 and 600 of FIGS. 4A–B and FIGS. 6A–B, respectively, can be used as such as one or more of aperture wheels 848r and 844r (to modify the red light) as one or more of aperture wheels 848b and 844b (to modify the blue light) and as one or more of aperture wheels 848g and 844g (to modify the green light). As in FIG. 8, the aperture wheels 848r and 844r, 848b and 844b, 848g and 844g can be used before the light valves (such as 850r, 850b, and 850g in FIG. 8, respectively) and after the one or more color separators (such as 824c and 824y). The selectable aperture wheels or aperture devices are shown located before the light valves (such as aperture wheels 848r and 844r before light valve 850r) but it is possible to locate the selectable aperture wheels after the light valves.

The solid slopes 350 in FIG. 5 shows the FIG. 8 embodiment with the aperture devices 848r, 848g, 848b, and 844r, 844g, and 844b in an unmodified case, i.e. all of the aperture devices act as through holes with no filter. In FIG. 5 the unmodified color separation cutoff point of the blue light is shown as 382b on the solid slopes 350 and has a cutoff of approximately 478 nm. In the "unmodified case" the aperture wheel 444 like that shown in FIG. 4A or aperture wheel 600 of FIG. 6A has an aperture (such as one of apertures 410–422 or apertures 612–622) selected into the blue light path that is a through hole with no filter. In this way the blue light reflected from color separator 824y of FIG. 8 passes freely through the selected apertures of the aperture wheels 848b and 844b without modifying the cutoff of the blue light. The green light and the red light are treated similarly to the blue light in the unmodified case.

The dashed slopes 250 shows a case where one of the aperture wheels for each colored light path has been rotated so that an aperture with the appropriate cutoff filter has been placed into the appropriate light path. For example, 280b shows a modified cutoff over 382b. The 280b cutoff is approximately 472 nm and it is now apparent that the bandwidth has been reduced. The 280b cutoff was produced when one of the aperture wheels 848b or 844b of FIG. 8 was rotated so that an aperture with the appropriate cutoff filter was placed into the blue light path.

The term cutoff filter, as used in this application, is a filter designed to cutoff unwanted frequencies and to produce a desired frequency range. An aperture device or component of an aperture device comprised of a group of cutoff filters would allow for the selection of different cutoff frequencies. The selection of different frequencies would appear visually as modifications of the original colors of light. When a frequency is modified from an original frequency different cutoff filters representing different cutoff frequencies are selected to be placed in the path of light after a color separator.

The dashed slopes 550 shows a case where one of the aperture wheels for each colored light path has been rotated so that an aperture with a different cutoff filter has been placed into the appropriate light path. For example, by rotating one of the aperture wheels 848b or 844b to a new aperture, a different cutoff filter can be placed into the blue light path producing a result like that of 586b of FIG. 5. When the aperture wheel, such as wheel 848b is rotated to place a cutoff filter that produces the results of 586b of FIG. 5 into place, it is clear that the bandwidth of the blue light has been substantially narrowed over that of the unmodified bandwidth having a cutoff point at 382b. The cutoff point of 586b is approximately 460 nm.

It could be possible to just simply electronically switch off (preventing the light to pass through the light valve) all of the areas around a round transmitted image created by the light valves 850g, 850b, and 850r in FIG. 8, by the light valves themselves. However it can be possible to see a ghost image of the areas surrounding the round image created by the light valves 850g, 850b, and 850r because each of the light valves may not be capable of switching off one hundred percent (100%) of the light surrounding the round image. With a variable aperture, (such as variable apertures 892r, 892g, and 892b) the areas around the desired round image can be masked.

The irises or variable apertures 892r, 892g, and 892b for the corresponding individual light valves 850r, 850g, and 850b, respectively, may be driven by motors as known in the art and may respond individually or all together. The size of the aperture created by each of the variable apertures 892r, 892g, and 892b can be controlled by commands sent from the remote console 780 in FIG. 7 if desired.

It is also possible to have aperture wheels that contain different types of apertures located in the variable aperture position of 892r, 892b and 892b. Aperture wheels that contain different types of apertures are known in the art as gobo wheels. They are also driven by motors. The gobo wheels containing two or more apertures each, may respond individually to modify the aperture size prior to the corresponding appropriate light valve, such as 850r, 850g, or 850b or gobo wheels may respond all together to modify the aperture prior to all the light valves 850r, 850g, or 850b.

Variable apertures, such as variable apertures 892g, 892b, and 892r can be used as in FIG. 8 before corresponding light valves 850g, 850b, and 850r, respectively. In either case the light valves 850g, 850b, and 850r can be a reflective or a transmissive type [depending on how the optical system is designed.] Variable apertures, such as variable apertures 892g, 892b, and 892r can also be used after corresponding light valves 850g, 850b, and 850r, respectively, but before the color combining device 876. In either case the variable apertures 892g, 892b, and 892r should also be used after white light has been separated into the component colors of light, which in this case is green, blue, and red light.

While only two bandwidth modification examples are shown in FIG. 5 for the modification from the unmodified slope 350 of FIG. 5, it is clear that many more incremental modifications can take place for each of the blue, green and red lights. An aperture wheel, such as aperture wheel 848b, 848g, 848r, 844b, 844g, or 844r or aperture device may contain many more filters for further modifying the bandwidth.

In FIG. 5, the green light spectrum from the color separation system of an embodiment of the present invention is shown on the solid sloped line 350 which includes the green cutoff points 372g and 362g. The solid sloped line 350 is again the unmodified case for FIG. 8, i.e. a through hole for all of the aperture devices or aperture wheels. The aperture wheels 848g and 844g for green light are positioned in front of the green light valve 850g in FIG. 8 similar to the way the aperture wheels 848b and 844b are positioned for the blue light valve 850b discussed above. The green light transmitted through color separator 824y of FIG. 8 reflects off of reflector 830a and passes through the aperture wheels 848g and 844g. The aperture wheels 848g and 844g may be similar to aperture wheel 400 of FIG. 4A or aperture wheel 600 of FIG. 6A.

If one of the aperture wheels of 848g and 844g is rotated to position a cutoff filter into the green light path at the location of arrow 872 in FIG. 8, a modification to the green light color cutoff can take place. For example, cutoff points 270g and 260g are shown on dashed slopes 250 of FIG. 5 and together show a narrower band of green light than cutoff points 372g and 362g for the unmodified case. The result of narrowing the green bandwidth to the bandwidth between the cutoff points of 270g and 260g was accomplished by rotating a cutoff filter into the green light path at location of arrow 872 in FIG. 8 by one of the aperture wheels 848g or 844g of FIG. 8. If yet a different cutoff filter were to be placed into the green light path by one of the aperture wheels 848g or 844g of FIG. 8 then we can see the results on the dashed slopes 550 on which the cutoff points 576g and 566g are located in FIG. 5. The cutoff points of 576g and 566g of FIG. 5 have produced a substantially narrower bandwidth and in turn a more saturated green color than the original unmodified bandwidths on the solid slope 350 corresponding to the cutoff points of 372g and 362g.

It is important to note that it is possible to use combinations of cutoff filters to modify the color of light produced by the color separation system of the present invention. For example, in FIG. 5 we could select a cutoff filter to be placed on the aperture wheels (such as one of aperture wheels 848g or 844g) that only modifies one side of the green bandpass. In this example we might only modify the original cutoff point 372g to a cutoff point of that shown by 576g yet there will be no modification to the cutoff point of 362g of the green light. Combinations of high pass cutoff and low pass cutoff filters can allow for many variations in the green color bandwidth.

Cutoff point 342r of FIG. 5 shows an unmodified color separation cutoff for the red light on the unmodified solid slopes 350. In the unmodified state the aperture wheels 848r and 844r of FIG. 8 have been rotated to an unfiltered aperture for the cutoff point of 342r. A modification to the cutoff point of 240r of dashed line slopes 250, is produced when an aperture containing a cutoff filter is rotated into position by one of the aperture wheels 848r or 844r of FIG. 8. For example, the cutoff point of 240r on the dashed slopes 250 produces a narrower bandwidth red than the cutoff point of 342r. Additional cutoff filters can be rotated into place by the aperture wheels 848r or 844r of FIG. 8 to produce a cutoff point like 546r of FIG. 5 on the dashed slopes 550.

Lighting devices are often used on a stage where total darkness is possible. It is desirable to have high contrast ratios on the projection surface (such as surface on which the combined light is projected towards in the direction shown by arrow 882 in FIG. 8) between the image to be projected and the part of the projection surface that is supposed to be absent of any light. For instance, a multiple light valve lighting device might normally produce a rectangular image. This is because many of the available light valves have a rectangular aperture as known in the art. It could be a requirement for the lighting device to project a round image. While projecting the round image it is most desirable to effectively black out the outside corners of the rectangular image surrounding the round image. Unfortunately, light valves are not 100% effective in blocking out all the light when in the light blocking state. This means that an audience might still see a ghost of the original rectangular image when the lighting device is projecting the round image. In order to improve this situation under certain conditions, the invention uses apertures with light blocking material (or shutters) on the aperture wheels to block the light before it passes through the light valve. For example, if a round image were comprised entirely of blue and red light and as there is no need for the green light, a shutter would be placed into the path of the green light before the green light passes through the green light valve. In the embodiment of the present invention of FIG. 8, aperture wheel 848g or 844g may contain at least one shutter aperture for blocking the path of light. In the prior art when projecting images were comprised of red and blue light only, some small amount of green light would leak through the green light valve and further reduce the contrast ratio. With the embodiment of the present invention of FIG. 8, when an image is projected and is comprised entirely of red and blue light, an aperture containing a shutter would be placed, (such as on aperture wheel 848g or 844g) to block the green light from passing through the aperture wheel (such as aperture wheel 848g or 844g) to the green light valve (such as valve 850g).

Similarly, when an image is projected entirely of green and blue light an aperture containing a shutter would be placed (such as on aperture wheel 848r or 844r) to block the red light from passing thought the aperture wheel to the red light valve (such as 850r). Also similarly when an image is projected entirely of green and red light an aperture containing a shutter would be placed (such as on aperture wheel 848b and 844b) to block the blue light from passing through the aperture wheel to the blue light valve (such as valve 850b). Depending on what the image is comprised of, more than one aperture devices may block the light to more than one light valves. For instance, if the image is comprised of only blue light then it is possible to block the light to the red and green light valves.

When the lighting device, such as lighting device 1050 of FIG. 10 of the present invention, is not being used to project an image, such as via light shown by dashed lines 1055 and 1054, the aperture wheels (848r and 844r, 848g and 844g, 848b and 844b) for the red, green and blue light can rotate to place shutters to block the red, green and blue light from passing through to their prospective light valves (such as 850r, 850g, and 850b). In this way the invention prevents any light leakage from passing through the red, green and blue light valves insuring a good black out in very dark conditions. It would also be possible to position an aperture device with a shutter or a mask after a light valve if desired.

FIG. 4A shows an aperture wheel 400 with round apertures 410–422. The apertures 410–422 would be sized to allow the desired amount of light to pass through each aperture and then to the appropriate light valve. The apertures 410–422 on the aperture wheel 400 of FIG. 4A could also be of different shapes including rectangular or square. Any of the apertures 410–422 may have cutoff filters or color modifying filters, contain no filter and be a through hole, or may contain a shutter.

FIG. 6A shows an aperture wheel 600 with wedge shaped apertures 612–622. The apertures 612–622 would be sized to allow the light passing through the appropriate aperture on it's way to the appropriate light valve so that all the desired light would pass through the light valve. Any of the apertures 612–622 may have cutoff filters or color modifying filters, contain no filter and be a through hole, or may contain a shutter.

It is possible that the aperture wheels 848r, 848b and 848g may only be used as shutters and contain no cutoff filters. In this case only a single shutter aperture may be needed. This could improve the speed of the shutter allowing faster transitions between passing and blocking the light to the appropriate light valve (such as one of light valves 850g, 850b, and 850r). FIG. 9A shows single aperture device 900 that could either contain a filter or a shutter.

Various aperture devices can be used to place apertures into and out of a light path instead of an aperture wheel. FIG. 9B shows an aperture slide device 950 where apertures 930 and 932 are moved linearly into and out of the light path. Either aperture 930 or aperture 932 can contain filters of light blocking material. The aperture slide device 950 can be used instead of or combined with one or more of the aperture wheels 848r, 848g, 848b, 844r, 844g, or 844b, and at any of the locations of those aperture wheels in the FIG. 8 embodiment.

Instead of a mechanical aperture device that places filters into a light path, an aperture device like an electronically switchable spectral filter like that produced by ColorLink of Boulder Colo. (www.colorlink.com) could be used for modification of the color produced by the color separation system. By chromatically manipulating polarization, the switchable spectral filter can be designed to provide several different cutoff frequencies used to modify the color spectrum sent by a color separator to a light valve (such as light valves 850g, 850r, and 850b of FIG. 8).

Figure 11:
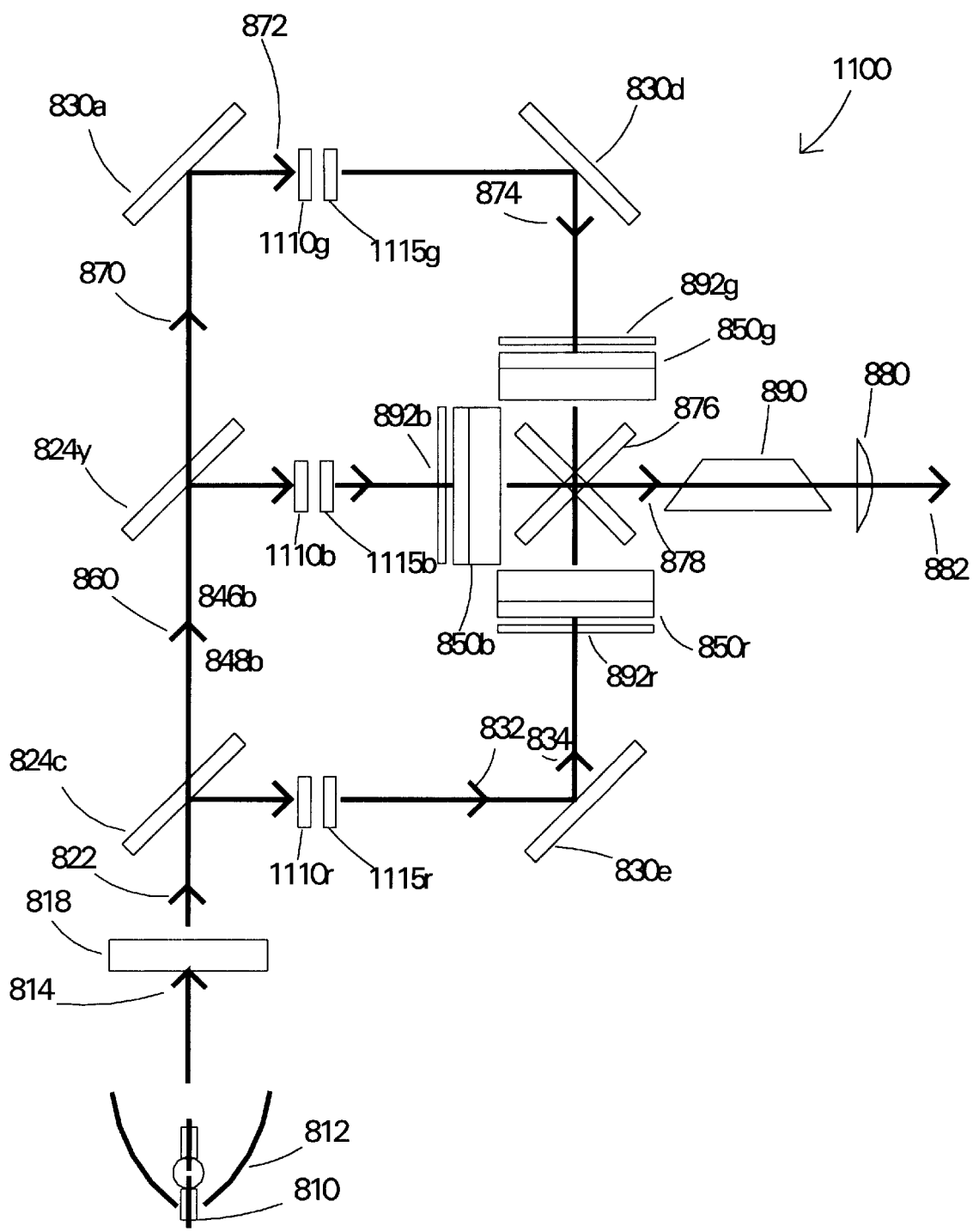
FIG. 11 shows an apparatus which is basically the same as the apparatus of the embodiment of FIG. 8, except that electronically switchable spectral filters have been substituted for aperture wheels (and their motors)

FIG. 11 shows the apparatus 1100 which is basically the same as the apparatus 800 of the embodiment of FIG. 8, except that electronically switchable spectral filters have been substituted for aperture wheels (and their motors). Electronically switchable filters 1110r and 1115r have been substituted for aperture wheels 848r and 844r (and their motors), electronically switchable filters 1110b and 1115b have been substituted for aperture wheels 848b and 844b (and their motors), and electronically switchable filters 1110g and 1115g have been substituted for aperture wheels 848g and 844g (and their motors).

Figure 12A:
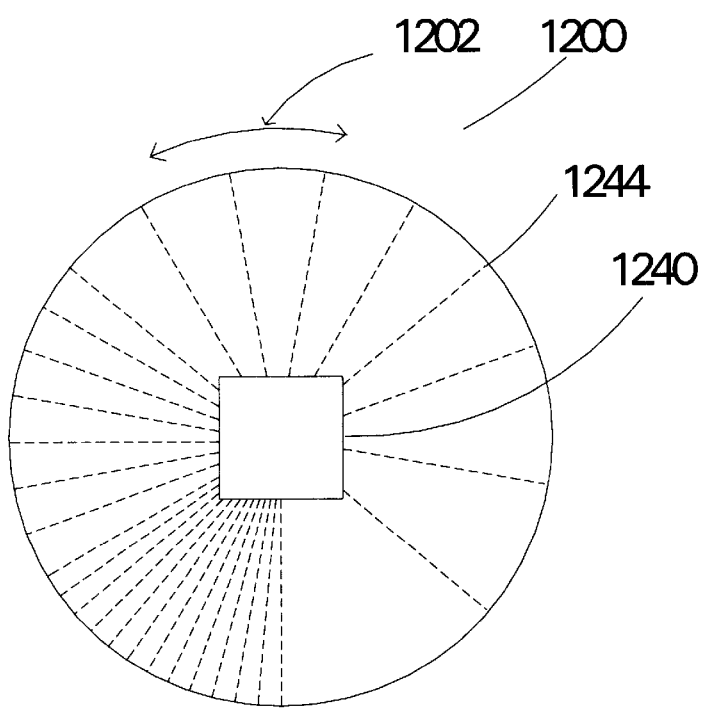
FIG. 12A show a front view of an aperture device including a circular variable filter (CVF)
Figure 12B:
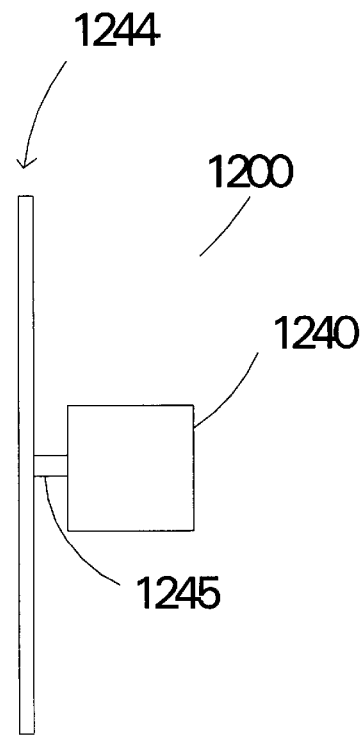
FIG. 12B shows a side view of the aperture device of FIG. 12A.

FIGS. 12A and 12B show front and side views of an aperture device 1200. Aperture device 1200 is comprised of a variable filter 1244, a motor shaft 1245 and a motor 1244. The variable filter 1244 may be attached or fixed to the motor shaft 1245 in any suitable manner. The motor shaft 1245 is rotatably connected to the motor 1240 and the motor shaft 1245 can be rotated by the motor 1240, to cause the variable filter 1244 to rotate, in the clockwise or counterclockwise directions shown by the arrows 1202. The variable filter 1244 may be an aperture wheel.

The variable filter 1244 may be a circular variable filter ("CVF"). A CVF can be designed as known in the art to vary its cutoff frequency as it is rotated. Variable filters are manufactured by several optical filter manufacturers including Optical Coating Laboratory, Inc of Santa Rosa Calif. More information on variable filters is found at their web site at: http://www.ocli.com/pdf_files/products/variable_filters.pdf A CVF can vary the cutoff frequency as the circular wheel, such as variable filter 1244, is rotated, in either the counterclockwise or clockwise directions shown by arrows 1202 in FIG. 12A. This allows smooth transitions that are not obtrusive to the audience viewing the particular multiple light valve lighting device of which the variable filter 1244 may be a part, such as a multiple light valve lighting device similar to 1050 of FIG. 10. This is because instead of the separate multiple filters inserted into the light path to change the cutoff frequency as shown, for example, in FIGS. 4A, 6A, and 9B, the variable filter 1244 of FIG. 12A can gradually change its cutoff frequencies as it is rotated in a path of light by motor 1240 of FIG. 12B. Of course it is important to note that it is known in the art that dichroic filters separate light by transmitting one frequency or set of frequencies and reflecting another frequency or set of frequencies. Variable filters like a CVF, that are variable dichroic filters, also separate light by transmitting one frequency or set of frequencies and reflecting another frequency or set of frequencies but are adjustable as known in the art.

Figure 13A:
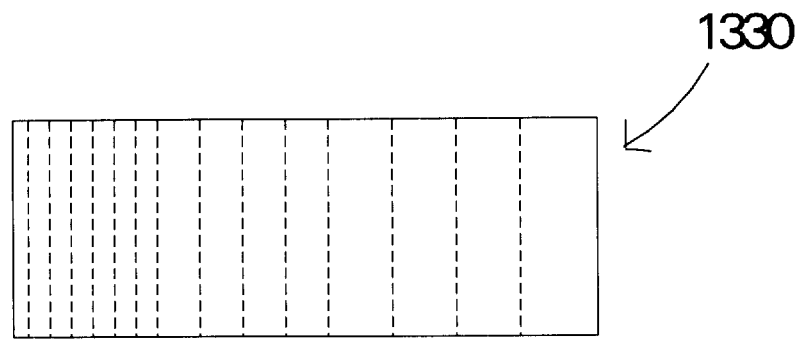
FIG. 13A shows a front view of a linear variable filter (LVF)

FIG. 13A shows a front view of another type of variable filter, variable filter 1330, which can also be called a linear variable filter or LVF. The variable filter 1330 is typically continuously variable and the dashed lines are shown only as a symbols of the filter 1330's variability. As known in the art an LVF, such as variable filter 1330, can vary its cutoff frequency as it is moved linearly in the path of the light. More information can be found on linear variable filters from Optical Coating Laboratory, Inc of Santa Rosa Calif.

Figure 13B:
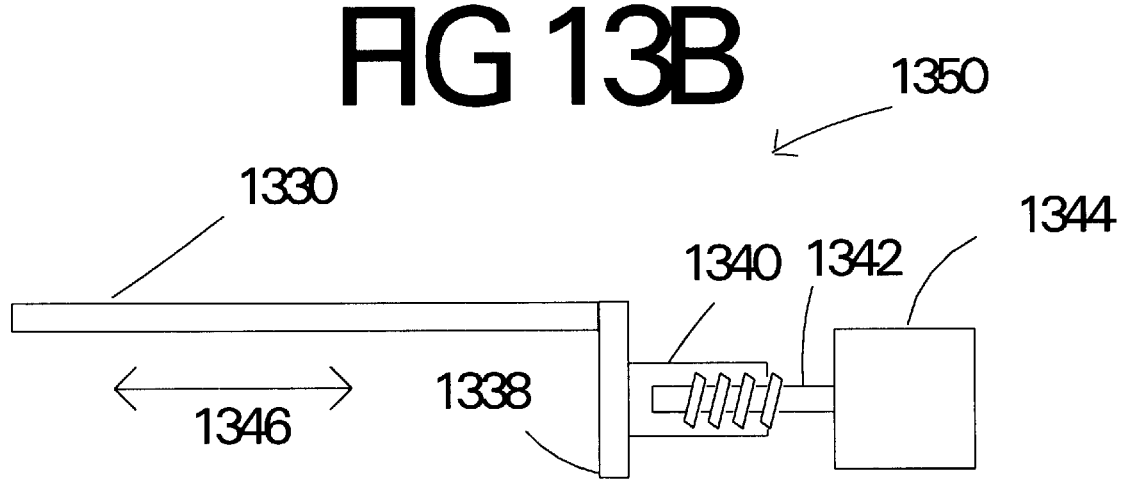
FIG. 13B shows a side view of a aperture device constructed of an LVF.

More information of variable filters is found at their web site at: http://www.ocli.com/pdf_files/products/variable_filters.pdf FIG. 13B shows a side view of an aperture device 1350 comprised of variable filter 1330, a mounting plate 1338, a power nut 1340, a worm gear shaft 1342, and a motor 1344. The variable filter 1330 is fixed to the mounting plate 1338 that is in turn fixed to the power nut 1340. The power nut 1340 is driven by a worm gear shaft 1342 by the motor 1344. The worm gear shaft 1342 is rotatably connected to the motor 1344. Arrows 1346 show the direction of movement of the variable filter when the motor worm gear shaft 1342 is rotated. The aperture device 1350 of FIG. 13B, generally can be used in any location where any other aperture device disclosed in the present application has been used.

Figure 14:
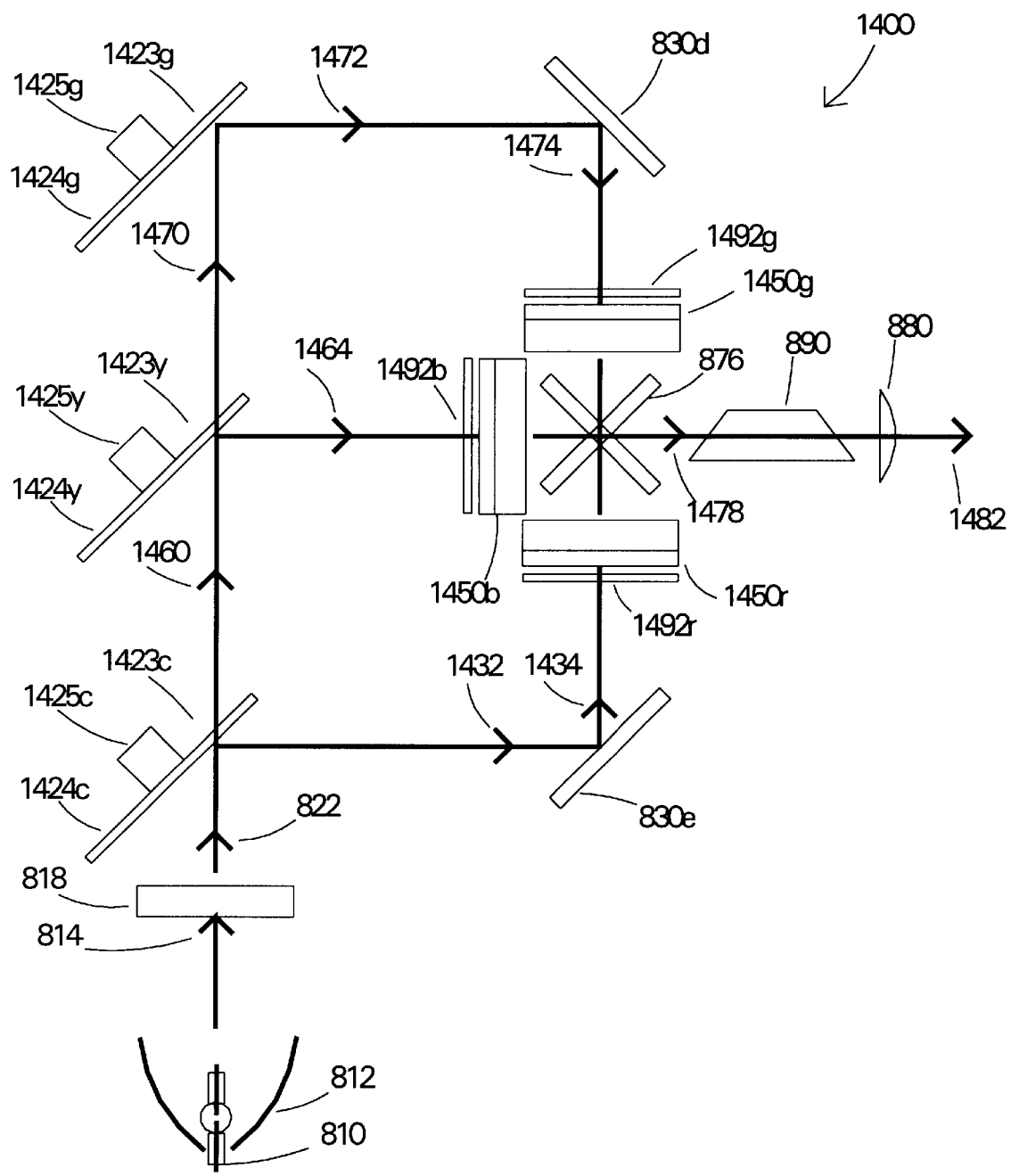
FIG. 14 shows an optical apparatus of an embodiment of the present invention using three light valves and aperture devices acting as color separators.

FIG. 14 shows an optical apparatus 1400 of an embodiment of the present invention. The optical apparatus 1400 is similar to optical apparatus 1100 of FIG. 11 with some exceptions. Optical apparatus 1400 is comprised of three light values, 1450r, 1450b, and 1450c which are similar to light valves 850g, 850b, and 850r in FIG. 11. Light valves 1450r, 1450b, and 1450 receive green, blue, and red light respectively, and the frequencies of each of the lights received are adjustable. In FIG. 14, the color separators 1425c, 1425y, and 1425g adjust the frequencies. Optical apparatus 1400 includes components 810, 812, 818, 830d, 830e, 876, 890, and 880 like apparatus 1100 of FIG. 11. Reflecting mirror 830a, and color separators 824y and 824c in apparatus 1100 have been replaced by aperture devices 1423g, 1423y, and 1423c. In addition, FIG. 11 includes components 1110g, 1110b, 1110r, 1115g, 1115b, and 1115r which are not included in FIG. 14. Optical apparatus 1400 also includes variable apertures 1492a, 1492b, and 1492c which are similar to variable apertures 892g, 892b, and 892r, respectively, shown in FIG. 11.

The aperture devices 1423g, 1423y, and 1423c shown in FIG. 14 are comprised of aperture wheels 1424g, 1424y, and 1424c, respectively, and motors 1425g, 1425y, and 1425c, respectively. In the embodiment of FIG. 14, the aperture devices 1423g, 1423y, and 1423c act as selectively variable color separators and replace the color separators 824c, 824y, and reflecting mirror 830a of FIG. 8. By rotating an aperture wheel in a color separator position such as aperture wheel 1424c in FIG. 14, the cutoff frequency of the reflected light in the direction of arrow 1432 can be varied. This eliminates the need for aperture devices, such as the aperture device comprised of wheel 848b and 844b in FIG. 8, to be positioned after the wide band non-variable color separators, such as separator 824y, as shown in the embodiment of FIG. 8. Any one of the aperture devices 1423g, 1423y, and 1423c can be placed in one of a plurality of states to select a particular color separation. For example, aperture device 1423c can be placed in a first state to separate the light it receives from direction arrow 822 into a first color light output in direction 1432 and a first residual light output in direction 1460. Aperture device 1423c can also be placed in a second state to separate the light it receives from direction arrow 822 into a second color light output in direction 1432 and a second residual light output in direction 1460. Variable filters, such as the circular variable filter (CVF) in the color separator position as shown in FIG. 12A is preferred in this application.

The aperture wheel 1424c used as a color separator, may separate out the red light in the direction of an arrow 1432 by reflection, while transmitting or separating out a residual light comprised of blue and green light in the direction of an arrow 1460. The colored red light which is reflected at the first aperture wheel 1424c acting as a color separator can be called the first color light in a process in accordance with an embodiment of the present invention.

The separated residual light from aperture wheel 1424c heads in the direction of arrow 1460 towards the aperture device 1423y comprised of aperture wheel 1424y and motor 1425y. The aperture wheel 1424y acting as a variable color separator, may separate out the blue light from the blue and green residual light that is transmitted from aperture wheel 1424c. The reflected separated blue light heads in the direction of arrow 1464 towards variable aperture 1492b and blue light valve 1450b. The residual green light transmitted from aperture wheel 1424y is sent in the direction of arrow 1470 towards the aperture device 1423g comprised of aperture wheel 1424g and motor 1425g. At aperture wheel 1424g the green light is reflected in the direction of arrow 1472 towards reflecting mirror 830d. The green light is reflected off of the reflecting mirror 830d as shown in the direction of arrow 1474 towards variable aperture 1492g and the blue light valve 1450g.

The aperture wheels 1424c, 1424y and 1424g can be rotated in the light path by their motors 1425c, 1425y, and 1425g, respectively. When any one of the aperture wheels 1424c, 1424y, and 1424g are rotated, different filters on the particular aperture wheel are placed into the light path to vary the reflective light. Each of aperture devices 1423g, 1423y, and 1423c can be, or can be replaced by one of the aperture devices shown for example in FIGS. 4A, 6A, and 9B. At least two different cutoff filters would be used for each aperture device. The cutoff filters would be dichroic filters and their reflective and transmissive properties would be used. Each of aperture devices 1423g, 1423y, and 1423c can be replaced by a type of aperture device that linearly places different cutoff filters into the light path, as shown for example, by FIG. 9B. The aperture devices 1423g, 1423y, and 1423c in FIG. 14 could also use, or be replaced by aperture devices that use, variable filters such as those shown in FIGS. 12B and 13B instead of multiple discrete filters.

Aperture wheel 1424c acts as a variable color separator using a variable filter, and aperture wheel 1424c reflects red light. When varying the aperture wheel 1424c the reflected light frequencies can be varied from a dark red light, to a medium red color, to an orange red color to an orange color. As the aperture wheel 1424c or variable filter 1424c is rotated the reflected cutoff frequencies are varied. This is because the variable filter or aperture wheel 1424c is specified to reflect red light from orange to dark red as it is rotated. Specifying a variable filter to do such is known in the art.

Figure 15:
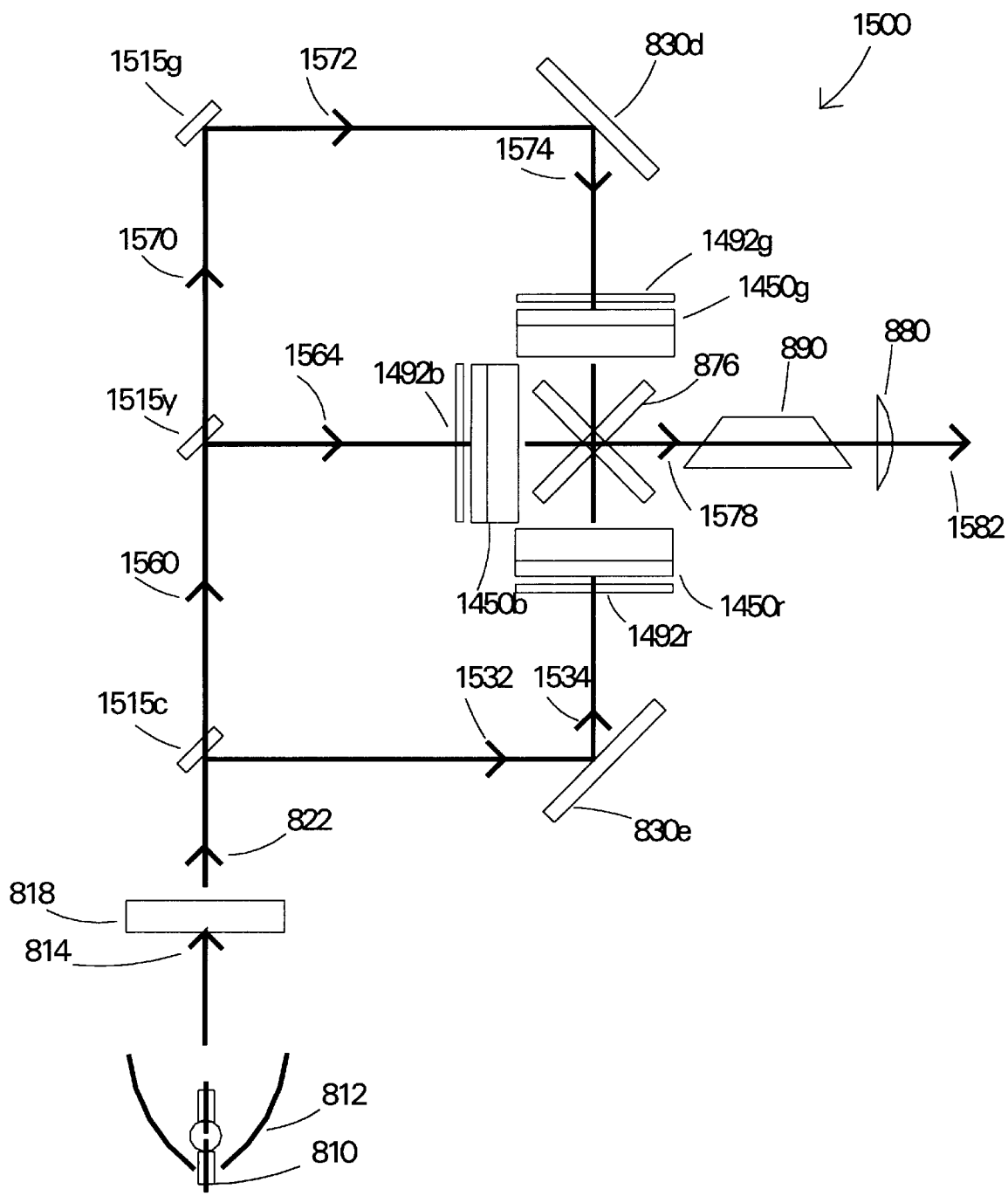
FIG. 15 shows an optical apparatus similar to the optical apparatus of FIG. 14, except that electronically switchable spectral filters have been substituted for aperture devices in the apparatus of FIG. 14, to be used as color separators.

FIG. 15 shows the apparatus 1500. Apparatus 1500 contains the same components as apparatus 1400 in FIG. 14, except that apparatus 1500 includes electronically switchable spectral filters 1515g, 1515y, and 1515c in place of aperture devices 1423g, 1423y, and 1423c of apparatus 1400. The spectral filters 1515g, 1515y, and 1515c would provide the same function as their counterparts 1423g, 1423y, and 1423c in FIG. 14. Also the direction arrows 1432, 1434, 1460, 1464, 1470, 1472, 1474, 1478, and 1482, have been replaced by direction arrows 1532, 1534, 1560, 1564, 1570, 1572, 1574, 1578, and 1582, however, these similarly numbered direction arrows may symbolize the same light or light path focussed in the same direction.

In operation, the apparatus 1500 functions somewhat similar to the apparatus 1400 of FIG. 14. In the embodiment of FIG. 15, the electronic spectral filters 1515g, 1515y, and 1515c act as selectively variable color separators. Any one of the filters 1515g, 1515y, and 1515c can be placed in one of a plurality of states to select a particular color separation. For example, aperture device 1515c can be placed in a first state to separate the light it receives from direction arrow 822 into a first color light output in direction 1532 and a first residual light output in direction 1560. Aperture device 1515c can also be placed in a second state to separate the light it receives from direction arrow 822 into a second color light output in direction 1532 and a second residual light output in direction 1560.

FIG. 7 shows a control system 760 for controlling aperture wheels 848r, 844r, 848g, 844g, 848b, and 844b and lighting valves 850r, 850g, and 850b of the FIG. 8 embodiment. The control system 760 and the remote control 780 is used for the operation of a multiple light valve lighting device such as device 1050 of FIG. 10.

In operation, signals are sent over a communications system from the remote console 780 to the control system 760 through the wiring conductors 772. The communication system may be used to send program material to the control system 760 from the remote console 780. The program material may provide information as to how the light valves 850r, 850g, and 850b are controlled to produce an image. Some examples of program material are computer graphic and video signals. It is also possible that a second communication system between the remote console 780 and the control system 760 may be used to send live video or graphical information to be stored into memory of the microprocessor 728 of FIG. 7.

The control system 760 has a communications node 730 for receiving communication signals from the remote console 780. The communications node 730 passes the signals to the microprocessor 728 through the conductors 729. The microprocessor 728 receives the data as received by the communication node 730 and first determines if the unique address data contained from the received data is the correct address as known in the art. If the microprocessor 728 determines that it has received a correct address contained within the received data, the microprocessor 728 may next act upon a command signal contained within the received data that is sent from the remote console 780 over the communications system. If a command signal is sent from the remote console 780 that contains a command for modification of the green color, the microprocessor 728 sends control signals via conductors 723 to the motor drive device 722 that in turn sends the appropriate control signals to the motors 840g or 846g.

The microprocessor 728 may also receive commands from the remote console 780 to control the light valves 850r, 850g, and 850b. The microprocessor 728 sends control signals via the conductors 721 to the light valve controlling device 720. The light valve controlling device 720 determines which one of the light valves of light valves 850r, 850g, and 850b, the microprocessor 728 desires to control, and sends the appropriate control signals to the light valves 850r, 850g or 850b though conductors 752r, 752g, or 752b, respectively.

The microprocessor 728 receives its necessary operating power from the power supply 726 through conductors 727 and also routes power through conductors 729, 721, 719 and 723 to the communications node 730, the light valve controlling device 720, thermal monitoring device 714, and the motor drive device 722. The power supply 726 also supplies power to the lamp power supply 724 via conductors 725. The lamp power supply 724 may receive control signals from the microprocessor 728 through conductors 732. The lamp power supply 724 supplies the necessary power to operate the lamp 710. The lamp power supply 724 may be variable so as to supply variable power to the lamp 710.

The lamp power supply 724 may be capable of supplying power to the lamp 710 in excess of the manufacturer's continuous rated power level, for example if the lamp 710 is rated by the manufacturer at 200 watts the power supply 724 may deliver upon signals 300 (three hundred) watts or greater to the lamp 710. It is possible to control the amount of power to the lamp 710 in accordance with the amount of light energy to pass through a particular light valve (such as one of light valves 850r, 850g, or 850b). For example more saturated colors have less energy to pass through a light valve while less saturated colors pass more energy through the light valves. If one or more of the light valves, such as light valves 850r, 850g, and 850b has a limit as to how much energy can be transmitted through the light valve the power to the lamp 810 may need to be regulated to reduce the energy. If one or more of the light valves 850r, 850g, or 850b has a limit as to how much energy can be blocked by that light valve, the power to the lamp 810 may have to be regulated to reduce the energy. It can be possible using duty cycle control to increase the power to the lamp 810 for brief durations so that light energy passing through the light valves 850r, 850g, and 850b is of higher energy than normally would be allowed as a continuous duty. By varying the power to the lamp 810 under different conditions, the lighting device 1050 of FIG. 10 can be optimized for maximum light output under a variety of conditions. In FIG. 7, the control system 760 may automatically adjust the power to the lamp 810 by determining the color spectrum in use, the placement of an aperture device, such as an aperture on one of aperture wheels 848r, 844r, 848g, 844g, 848b, or 844b into the light path, the control condition of a light valve (such as one of light valves 850r, 850g, or 850b), or even the physical placement of the lighting device 1050 of FIG. 10.

It is also possible for the lighting device 1050 of FIG. 10, to automatically close and open light blocking apertures (shutters), such as on aperture wheel 848r, based upon the state of the light valves (such as light valve 850r) as controlled by the light valve controlling device 720 as determined by the microprocessor 728 of FIG. 7. For example, when the green light valve 850g of FIG. 7 of an embodiment of the present invention is controlled to the light blocking state for any given amount of time the green aperture device 844g can block the light path of the green light from reaching the green light valve 850g. The microprocessor 728 of FIG. 7 monitors the state of the red, green and blue light valves 850r, 850g, and 850b, respectively, as controlled by the light valve controlling system 720 and if any of the light valves are determined to be in the light blocking state for any given period of time, the microprocessor 720 will next send control signals to the motor drive device 722 of FIG. 7 to operate one of the motors 846r, 840r, 846g, 840g, 846b or 840b of the respective light valves to rotate the motor and change the aperture of the aperture device such as one of aperture wheels 848r, 844r, 848g, 840g, 848b or 844b. The light blocking state is defined as when a light valve of light valves 850r, 850g, and 850b are controlled by the light valve controlling device 720 to substantially block the light from passing through the light valve onward to the projection lens.

If the microprocessor 728 determines that all three light valves 850r, 850g, and 850b are in the light blocking state, all of the aperture devices, such as aperture devices 848r, 844r, 848g, 844g, 848b, and 844b may block the light going to their respective light valves. This may be done automatically by monitoring the status of the light valve control signals. Also a black out command may be sent to the lighting device (like that shown as 1050 of FIG. 10) from the remote console 780 that is received by the communications node 730 and in turn is sent through conductors 729 to the microprocessor 728. The command is interpreted by the microprocessor 728 and control signals are sent to the motor drive device 722 to in turn operate the motors 846r, 840r, 846g, 840g, 846b, and 840b. The motors 846r, 840r, 846g, 840g, 846b, and 840b are operated to place a light blocking aperture from the aperture wheels 848r, 844r, 848g, 844g, 848b, 844b in front of light before their respective light valves. When the light blocking apertures of the aperture devices are placed to block the light with a light blocking material in the light path from the color separators, the aperture devices are considered to be in the light blocking state. Aperture wheels 848r and 844r (with or without their motors 846r and 840r) can be considered to be first and second components of a single aperture device. Similarly aperture wheels 848g and 844g can be considered to be first and second components of a single aperture device. Similarly aperture wheels 848b and 844b can be considered to be first and second components of a single aperture device.

It is also possible to reduce power to the lamp when the microprocessor 728 of FIG. 7 determines that all three light valves 850r, 850g, and 850b are in the light blocking state. After the microprocessor 728 determines that all three light valves are in the light blocking state, the microprocessor may next sends control signals over the conductors 732 to control the lamp power supply 724 to reduce the power to the lamp 810. By reducing power to the lamp 810 the light output is reduced. When the light output is reduced by reducing power to the lamp 810 any light that is passing through the light valves 850g, 850b, and 850r in the light blocking state is reduced and thus improves the contrast ratio. If any of the three light valves 850g, 850b, or 850r is determined by the processor 728 not to be in the light blocking state a control signal is sent over the conductors 732 to control the lamp 810 power supply 724 to raise the power to the lamp 810 for normal operation.

FIG. 10 shows two similar multiple light valve lighting devices 1050 and 1060 connected over a communication system to a remote console 780. The focusing projection lens 880 of the FIG. 8 embodiment is shown for projecting an image onto a stage 1020. The stage could consist of various projection materials including screens, drapes, walls and flooring as well as props and other materials known in the art of stage lighting. The components of the FIG. 8 embodiment are located in the lighting device 1050. The control system 760 of FIG. 7 is also located in the lighting device 1050.

The combined light path from the lens 880 to a stage or projection surface 1020a is shown as dashed lines 1054 and 1055. Device 1060 is similar and may be identical to device 1050 and contains projection lens 1062. The lens 1062 may be considered to be a projection lens. A focusing lens and a projection lens are considered to be the same as described in this application.

A combined light path from the lens 1062 to the stage or projection surface 1020a is shown by dashed lines 1064 and 1065.

A remote console 780 sends commands over a communication system as known in the art over the communication cables 772 and 778. Connectors 774, 1076 and 1084 connect the communication cables into internal communication nodes (not shown) like 730 of FIG. 7. Connector 770 connects the communication cable 772 to the remote console 780. A power source 790 such as that provided by the power line is connected to power the console 780 at 796 and device 1050 at 794 and device 1060 at 1095.

The lighting device like that shown as 1050 of FIG. 10 should have a unique address so that it can respond to the command signals from the remote console 780 separately from other lighting devices such as 1060 of FIG. 10 on the same communications system as known in the prior art. In FIG. 10, two lighting devices are shown however many more may be connected to the same communications system. Some examples of command signals sent over the communication system from the remote console 780 to the multiple light valve lighting device 1050 like that shown in FIG. 10 are: lamp on, lamp off, black out, color modify red, color modify green, color modify blue, shutter open red, shutter close red, shutter open green, shutter close green and shutter open blue, shutter close blue, all shutters open, and all shutters closed.

The operator of the remote console 780 may command the lighting devices 1050 or 1060 by using command signals over the communication system to vary the color palette. This may be done at any time that the lighting devices 1050 or 1060 are in operation and can be used to create special effects and vary the visual look of the projected colors for aesthetic reasons. The operator inputs to the remote console 780 the desired change to the color palette of a particular multiple light valve lighting device via a keypad or a switch entry system as known in the art. The remote console 780 processes the commands received by a keypad 782 and transmits command signals over the communication system over cable conductors 772 and 1078. The command signals may also contain the unique address of the lighting device 1050 or 1060 that the operator wishes to command. A multiple light valve lighting device such a device 1050 of FIG. 10 receives the commands signals over the communications system and next determines if the lighting device 1050 or 1060 has the correct unique address to respond to the command signals. If the unique address received matches the unique address of the lighting device 1050 of FIG. 10, the lighting device 1050 next responds to the command signal by changing the color palette of the red, green or blue in accordance with the command issued by the operator through the remote console.

There are several different types of light valves known in the art. There are digital mirror devices (DMD) made by Texas instruments and the Liquid Crystal Displays (LCD) made by various manufacturers. The DMD is a reflective type light valve. LCD light valves may be of the reflective or transmissive type. FIG. 8 shows the transmissive type of light valves. Systems built similarly to prior art FIG. 1 are also built with reflective light valves. Regardless of the use of a reflective or transmissive light valves, the aperture devices can be placed before or after the light valves and after the color separator system to modify the color before or after the light valves.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising
a first light valve;
a second light valve;
a first aperture device;
wherein the first aperture device receives a first light comprised of a plurality of frequencies,
wherein the first aperture device can be placed in at least a first state and a second state;
wherein in the first state of the first aperture device, the first aperture device separates the first light into a first color light and a first residual light and in the second state of the first aperture device, the first aperture device separates the first light into a second color light and a second residual light, the first color light and the second color light being different;
wherein in the first state of the first aperture device, the first light valve receives the first color light, and in the second state of the first aperture device, the first light valve receives the second color light; and
wherein in the first state of the first aperture device, the second light valve receives at least a portion of the first residual light, and in the second state of the first aperture device, the second light valve receives at least a portion of second residual light.

2. The apparatus of claim 1 wherein
the first aperture device is comprised of a circular variable filter.

3. The apparatus of claim 1 wherein
the first aperture device is comprised of a linear variable filter.

4. The apparatus of claim 1 wherein
the first aperture device is comprised of a first aperture wheel.

5. The apparatus of claim 1 further comprising
a second aperture device;
wherein the second aperture device receives the first residual light from the first aperture device while the first aperture device is in the first state and the second residual light from the first aperture device while the first aperture device is in the second state;
wherein the second aperture device can be placed in at least a first state and a second state;
wherein in the first state of the second aperture device, the second aperture device separates either the first residual light or the second residual light, whichever the second aperture device has received, into a third color light and a third residual light and in the second state of the second aperture device, the second aperture device separates either the first residual light or the second residual light into a fourth color light and a fourth residual light, the third color light and the fourth color light being different; and
wherein in the first state of the second aperture device, the second light valve receives the third color light, and in the second state of the second aperture device, the second light valve receives the fourth color light.

6. The apparatus of claim 5 wherein
the first aperture device is a first electronically switchable filter; and
the second aperture device is a second electronically switchable filter.

7. The apparatus of claim 1 wherein
the first aperture device is a first electronically switchable filter.

8. A lighting device comprised of
a first device which separates a first light from a light source into a first frequency light and a second frequency light, wherein the first and second frequencies are different;
a first light valve having an input to which the first frequency light is applied, and an output, at which a first light valve output light is produced, the first light valve output light having a frequency;
a second light valve having an input to which the second frequency light is applied, and an output, at which a second light valve output light is produced, the second light valve output light having a frequency;
a combining device having an output, and an input to which the first light valve output light and the second light valve output light are applied, wherein the combining device combines the first light valve output light and the second light valve output light to produce a combined light at the output of the combining device; and
a projection lens having an output, and an input to which the combined light is applied, wherein the projection lens projects a combined light at its output,
wherein the frequency of the first light valve output light can be selectively varied.

9. The lighting device of claim 8
wherein the frequency of the first light valve output light to the projection lens can be selectively varied.

10. The lighting device of claim 8 wherein
the first device is comprised of a color separator and an aperture device;
wherein the first device separates the first light into the first frequency light and the second frequency light by reflection, such that the first frequency light is a reflected light;
and wherein the frequency of the first light valve output light to the projection lens can be selectively varied by the aperture device selectively varying the reflected light.

11. The lighting device of claim 8 wherein
the first device is comprised of a color separator and an aperture device;
and wherein the frequency of the first light valve output light to the output lens can be selectively varied by the aperture device selectively varying the frequency of the first frequency light.

12. The lighting device of claim 8 wherein
the first device is comprised of a color separator and an aperture device;
and wherein the frequency of the first light valve output light can be selectively varied by the color separator.

13. A lighting device comprised of
a first device which separates a first light from a light source into a first frequency light and a second frequency light, wherein the first and second frequencies are different;
a first light valve having an input to which the first frequency light is applied, and an output, at which a first light valve output light is produced, the first light valve output light having a frequency;
a second light valve having an input to which the second frequency light is applied, and an output, at which a second light valve output light is produced, the second light valve output light having a frequency;

a combining device having an output, and an input to which the first light valve output light and the second light valve output light are applied, wherein the combining device combines the first light valve output light and the second light valve output light to produce a combined light at the output of the combining device; and a projection lens having an output, and an input to which the combined light is applied, wherein the projection lens projects a combined light at its output, wherein the frequency of the second light valve output light can be selectively varied.

14. A method comprising the steps of separating a first light from a light source into a first frequency light and a second frequency light, wherein the first and second frequencies are different;

applying the first frequency light and the second frequency light to first and second light valves, to produce first and second light valve output lights, respectively;

combining the first and second light valve output lights to produce a combined light;

projecting the combined light;

and selectively varying the frequency of the first light valve output light.

15. A method comprising the steps of separating a first light from a light source into a first frequency light and a second frequency light, wherein the first and second frequencies are different;

applying the first frequency light and the second frequency light to first and second light valves, to produce first and second light valve output lights, respectively;

combining the first and second light valve output lights to produce a combined light;

projecting the combined light;

and selectively varying the frequency of the second light valve output light.

16. The method of claim 15 wherein the frequency of the first light valve output light is selectively varied during the step of separating the first light into a first frequency light and a second frequency light.

17. A light valve lighting device comprising a first light valve;

a second light valve;

a light source; and a processor;

wherein the light source is supplied with power and wherein the power supplied to the light source is varied by the processor based upon a controlled condition of at least one of the light valves.

18. A light valve lighting device comprising a first light valve;

a second light valve;

a light source;

a processor;

an aperture device; and wherein the aperture device is varied based upon a controlled condition of at least one of the light valves.

* * * * *